US012517309B2

(12) United States Patent
Takano et al.

(10) Patent No.: US 12,517,309 B2

(45) Date of Patent: Jan. 6, 2026

(54) OPTICAL FIBER CONNECTOR

(71) Applicant: SENKO Advanced Components, Inc., Hudson, MA (US)

(72) Inventors: Kazuyoshi Takano, Tokyo (JP); Kenji Iizumi, Tokyo (JP); Chi Ho Fan, Kowloon (HK); Siu Kei Ma, Kowloon (HK)

(73) Assignee: Senko Advanced Components, Inc., Hudson, MA (US)

(*) Notice: Subject to any disclaimer, the term of this patent is extended or adjusted under 35 U.S.C. 154(b) by 500 days.

(21) Appl. No.: 18/052,613

(22) Filed: Nov. 4, 2022

(65) Prior Publication Data

US 2023/0135807 A1 May 4, 2023

Related U.S. Application Data

(60) Provisional application No. 63/317,040, filed on Mar. 6, 2022, provisional application No. 63/282,127, filed on Nov. 22, 2021, provisional application No. 63/275,638, filed on Nov. 4, 2021.

(51) Int. Cl.
*G02B 6/38* (2006.01)

(52) U.S. Cl.
CPC .................................. *G02B 6/3879* (2013.01)

(58) Field of Classification Search
CPC ....... G02B 6/381; G02B 6/387; G02B 6/3885
USPC .................................. 385/59, 60, 71, 72, 78
See application file for complete search history.

(56) References Cited

U.S. PATENT DOCUMENTS

| | | | | |
|---|---|---|---|---|
| 4,611,887 | A * | 9/1986 | Glover ................ | G02B 6/3897 385/71 |
| 5,806,175 | A | 9/1998 | Underwood | |
| 7,712,973 | B2 | 5/2010 | DiMarco | |
| 2003/0215171 | A1 | 11/2003 | Lampert et al. | |
| 2005/0135753 | A1* | 6/2005 | Eigenmann .......... | G02B 6/3879 385/71 |
| 2008/0232743 | A1 | 9/2008 | Gronvall et al. | |
| 2009/0208177 | A1 | 8/2009 | Smith | |

(Continued)

FOREIGN PATENT DOCUMENTS

CN 101065698 A 10/2007

OTHER PUBLICATIONS

International Search Report and Written Opinion of the International Searching Authority, dated Feb. 8, 2023, in related International Application No. PCT/US/22/48924, 10 pages.

(Continued)

*Primary Examiner* — Robert Tavlykaev

(57) ABSTRACT

An optical fiber connector with a housing configured to hold a plurality of optical fiber ferrules is selectively reconfigurable between a first configuration and a second configuration different from the first configuration. The housing can have different widths in the first and second configurations. The ferrules can have different ferrule arrangements in the first and second configurations. The optical fiber connector can be mateable with different types of receptacles in the first and second configurations. Reconfiguration can be achieved by disconnecting a rear housing from a plurality of front housings at first set of attachment points, rotating the rear housing 180° in relation to the front housings, and attaching the rear housing to the front housings at the second set of attachment points.

22 Claims, 29 Drawing Sheets

112 138 136 126 130 134 116 124 122 120 118 128 132 114

(56) References Cited

U.S. PATENT DOCUMENTS

2009/0245732 A1 10/2009 Murano
2016/0131854 A1 5/2016 de Jong
2016/0216458 A1 7/2016 Shih
2016/0349458 A1 12/2016 Murray et al.
2019/0018201 A1 1/2019 Takano et al.
2020/0183097 A1* 6/2020 Chang .................. G02B 6/4292
2020/0278504 A1 9/2020 Chang et al.
2020/0285000 A1 9/2020 Chang et al.
2020/0285001 A1* 9/2020 Childers .............. G02B 6/3812
2020/0310048 A1 10/2020 Chang et al.
2021/0080663 A1 3/2021 Takano et al.
2021/0124139 A1 4/2021 Meier et al.

OTHER PUBLICATIONS

International Search Report and Written Opinion of the International Searching Authority, dated Feb. 16, 2023, in related International Application No. PCT/US/22/45363, 8 pages.

* cited by examiner

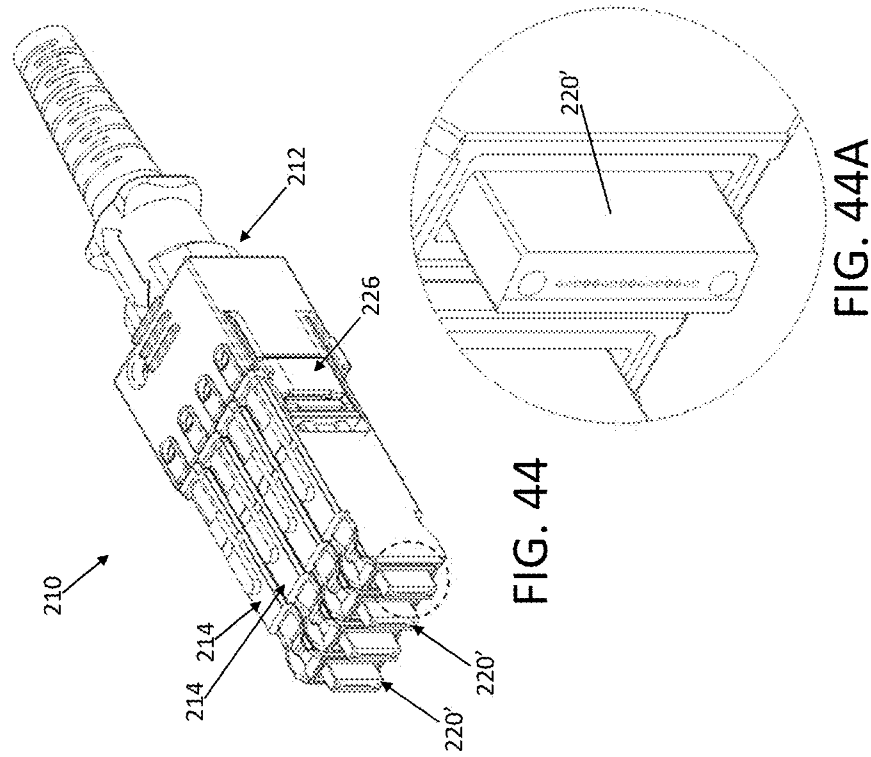
FIG. 44
FIG. 44A
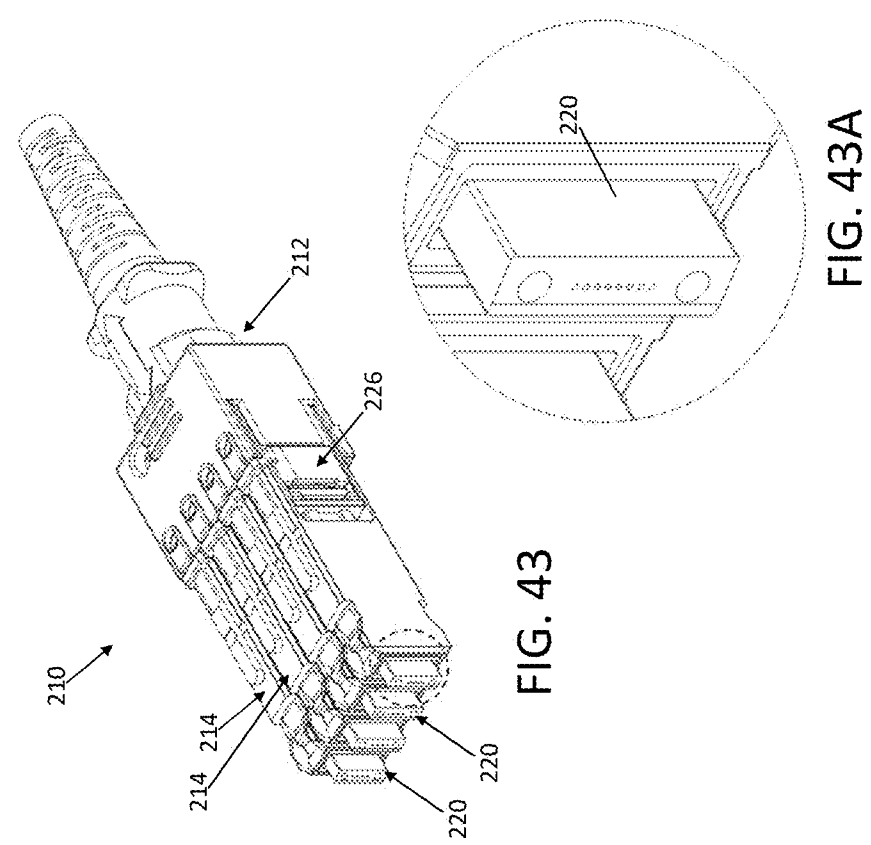
FIG. 43
FIG. 43A

OPTICAL FIBER CONNECTOR

CROSS-REFERENCE TO RELATED APPLICATIONS

This application claims priority to U.S. Provisional Patent Application Nos. 63/275,638, 63/282,127, and 63/317,040, each of which is hereby incorporated by reference in its entirety.

FIELD

This disclosure generally pertains to an optical fiber connector.

BACKGROUND

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, room for improvement in the area of data centers, specifically as it relates to fiber optic connections, still exists. For example, manufacturers of connectors and adapters are always looking to reduce the size of the devices, while increasing ease of deployment, robustness, and modifiability after deployment. In particular, more optical connectors may need to be accommodated in the same footprint previously used for a smaller number of connectors in order to provide backward compatibility with existing data center equipment.

SUMMARY

In one aspect, an optical fiber connector comprises a plurality of optical fiber ferrules and at least one front housing. Each front housing is configured for holding one or more of the optical fiber ferrules. a rear housing is configured to be releasably connected the front housing in either of a first configuration and a second configuration. In the first configuration, the optical fiber ferrules define a first width. In the second configuration, the optical fiber ferrules define a second width. The first width is different from the second width.

In another aspect, an optical fiber connector comprises a plurality of optical fiber ferrules. One or more connector housing components are configured to hold the plurality of optical fiber ferrules. The optical fiber connector is selectively reconfigurable between a first configuration and a second configuration. In the first configuration, the one or more connector housing components hold the plurality of optical fiber ferrules in a first ferrule arrangement and the optical fiber connector is mateable with a receptacle of a first type such that optical connections can be made to each of the plurality of optical fiber ferrules at the receptacle of the first type. In the second configuration, the one or more connector housing components hold the plurality of optical fiber ferrules in a second ferrule arrangement and the optical fiber connector is mateable with a receptacle of a second type such that optical connections can be made to each of the plurality of optical fiber ferrules at the receptacle of the second type.

Other aspects and features will be apparent hereinafter.

BRIEF DESCRIPTION OF THE DRAWINGS

FIG. 43 another perspective of the multifiber ferrule connector, showing the connector with eight-fiber ferrules;

FIG. 43A is an enlarged view of a portion of FIG. 43, showing one of the ferrules;

FIG. 44 is another perspective of the multifiber ferrule connector, showing the connector with sixteen-fiber ferrules;

FIG. 44A is an enlarged view of a portion of FIG. 44, showing one of the ferrules;

Corresponding parts are given corresponding reference characters throughout the drawings.

DETAILED DESCRIPTION

Referring to FIGS. 1-10, an exemplary embodiment of an optical fiber connector in the scope of this disclosure is generally indicated at reference number 110. As will be explained more fully below, connectors in the scope of this disclosure can comprise one or more optical fiber ferrules held in one or more housing components. In the illustrated embodiment, the connector 110 holds single-fiber ferrules (e.g., LC ferrules, cylindrical ferrules, round ferrules), but the disclosure also encompasses connectors that hold multi-fiber ferrules (e.g., MT ferrules, rectangular ferrules). As can be seen, the illustrated connector 110 is selectively adjustable between a first configuration, shown in FIGS. 1, 2, 5, 6, 7, 9, and 11, and a second configuration, shown in FIGS. 3, 4, 8, and 10. The first configuration is different than the second configuration. In the first configuration, the housing components hold the ferrules in a first ferrule arrangement and the connector 110 is mateable with a receptacle R1 of a first type, shown in FIGS. 1, 2, and 5. In the second configuration, the housing components hold the ferrules in a second ferrule arrangement and the connector 110 is mateable with a receptacle R2 of a second type. The ferrule spacing differs in the first ferrule arrangement and the second ferrule arrangement, allowing for optical compatibility with both types of receptacle R1, R2. In addition, the connector 110 has a first connector width CW1 (FIG. 9) in the first configuration and a second connector width CW2 (FIG. 10) in the second configuration, wherein the second connector width is greater than the first, again allowing for compatibility with two types of receptacles R1, R2.

Various types of receptacles can be accommodated using the general principles of this disclosure. In the illustrated embodiment, the first type of receptacle R1 has a plurality of channels (e.g., each channel supports at least one pair of Tx-Rx signals) undivided by partition walls and the second type of receptacle R2 comprises partition walls. The first type of receptacle R1 is also narrower than the second type of receptacle R2. The first type of receptacle R1 is also shutter-less, whereas the second type of receptacle includes one or more shutters (e.g., one or more shutter elements-per-channel).

Figure 12:
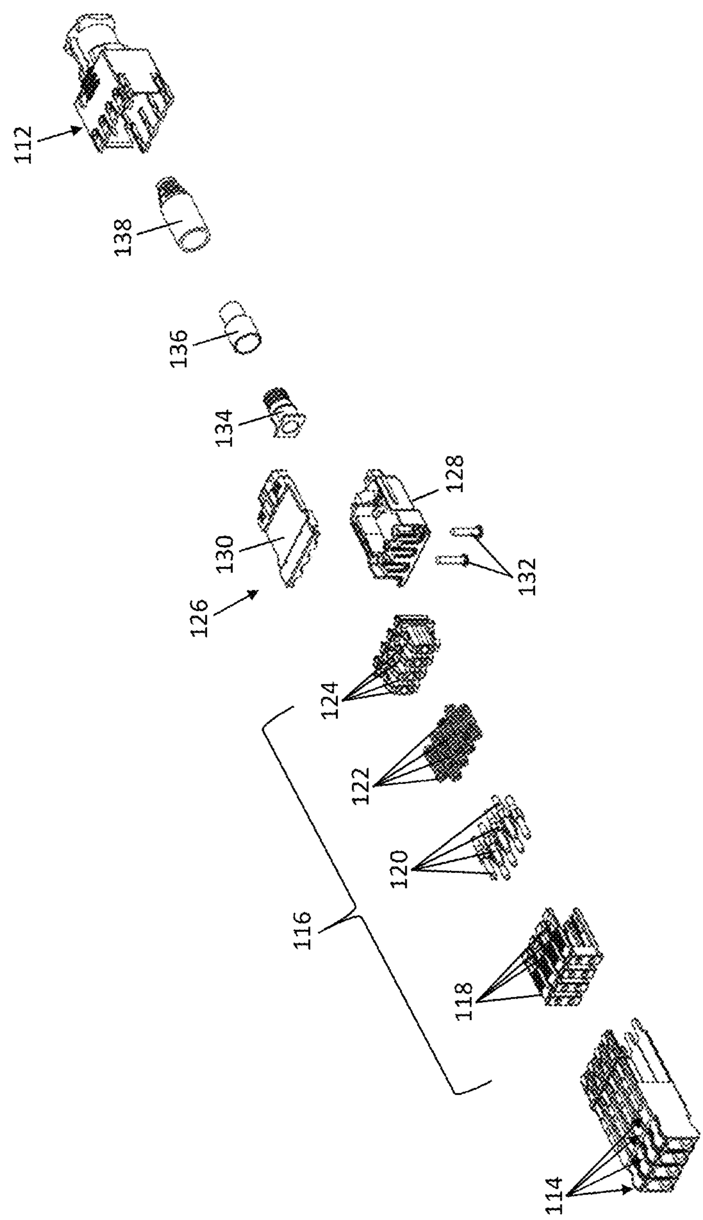
FIG. 12 is an exploded perspective of the connector.
Figures 13, 13A:
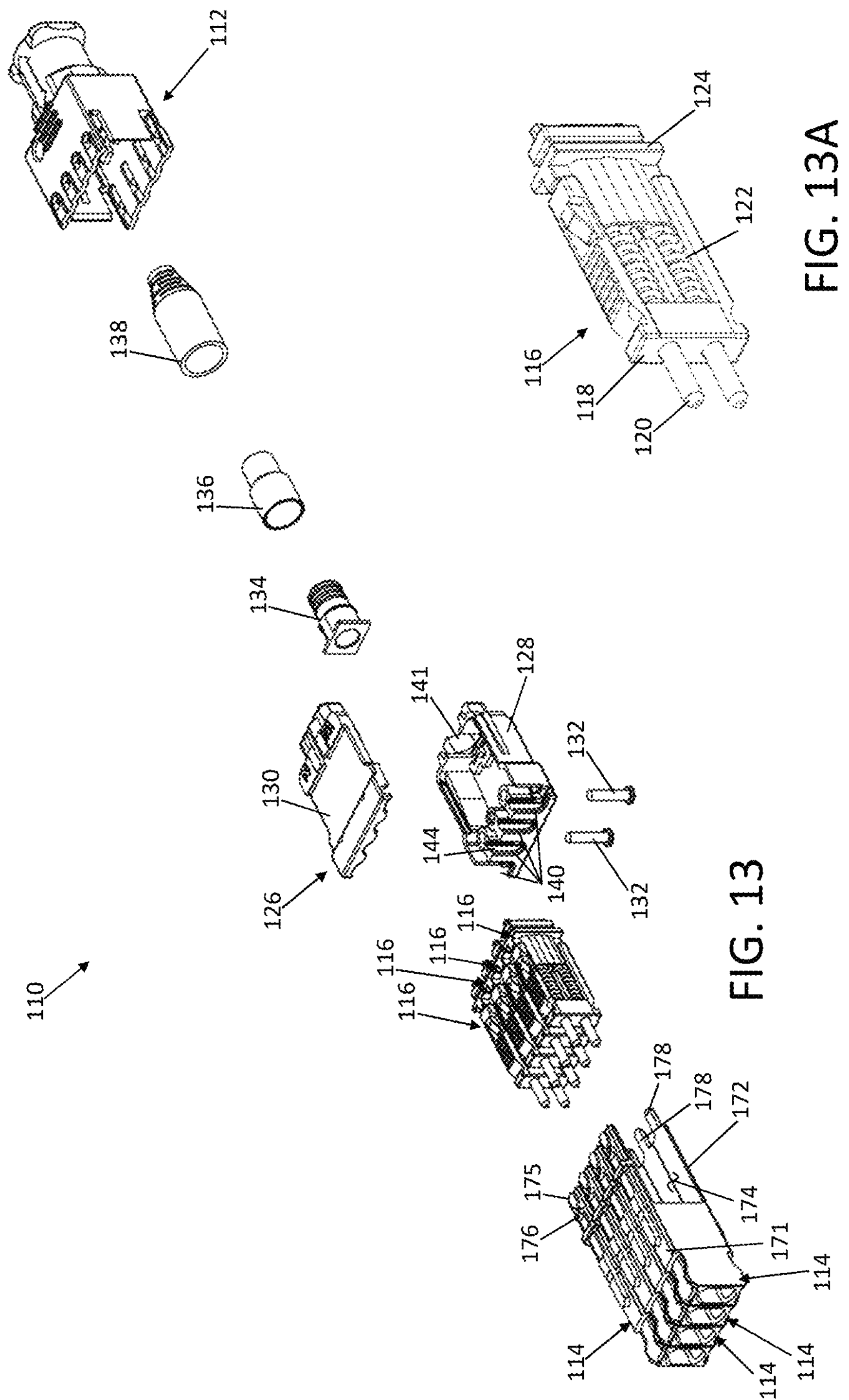
FIG. 13 is another exploded perspective of the connector.
FIG. 13A is a perspective of an inner connector subassembly.
Figure 15:
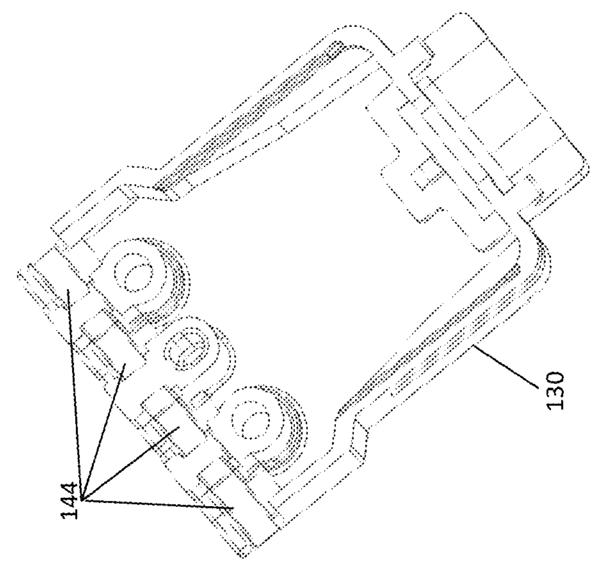
FIG. 15 is a perspective of a back body lid.
Figure 14:
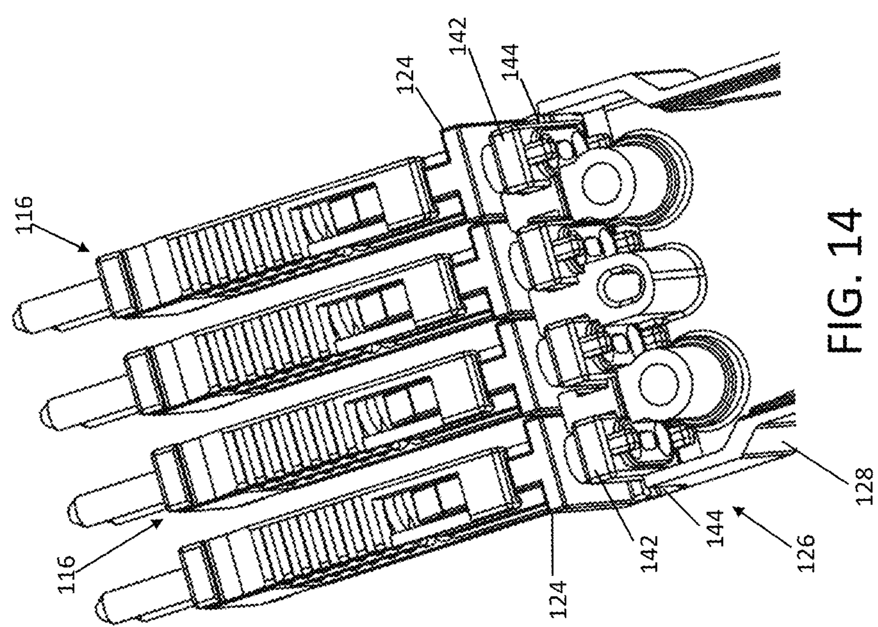
FIG. 14 is a fragmentary perspective of a subassembly of the connector including a back body base and a plurality of inner connector subassemblies.
Figure 17:
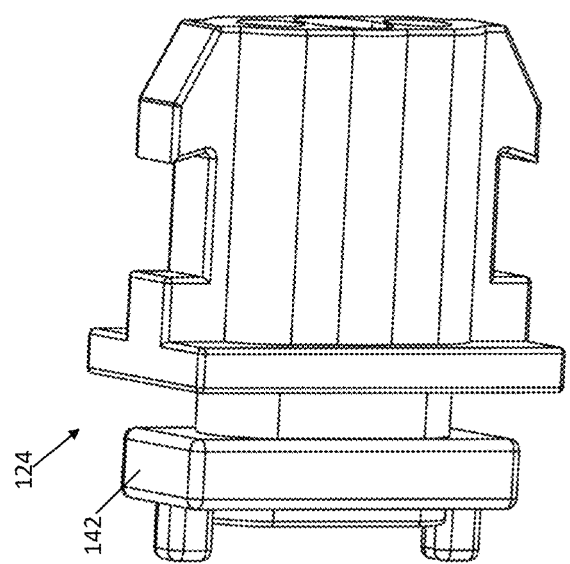
FIG. 17 is a perspective of the spring push.
Figure 16:
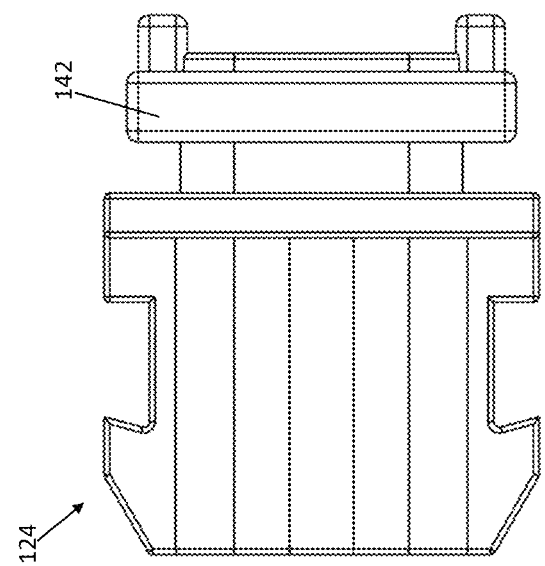
FIG. 16 is an elevation of a spring push.
Figure 20:
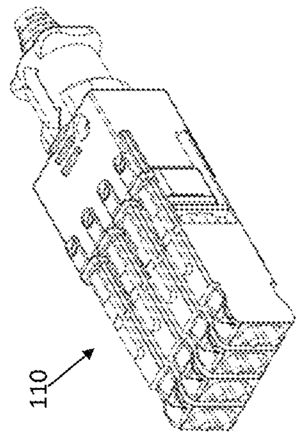
FIG. 20 is another perspective of the connector in the second configuration.
Figure 21:
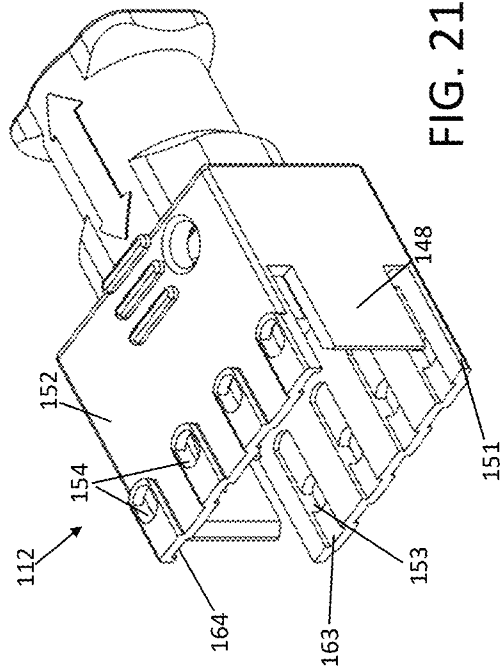
FIG. 21 is a perspective of the rear housing in a second, inverted orientation corresponding to the second configuration as shown in FIG. 20.
Figure 18:
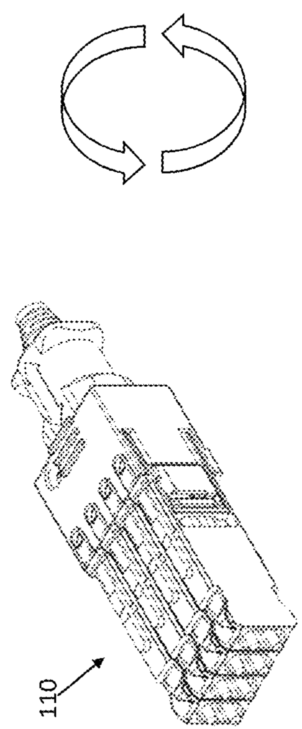
FIG. 18 is another perspective of the connector in the first configuration.
Figure 19:
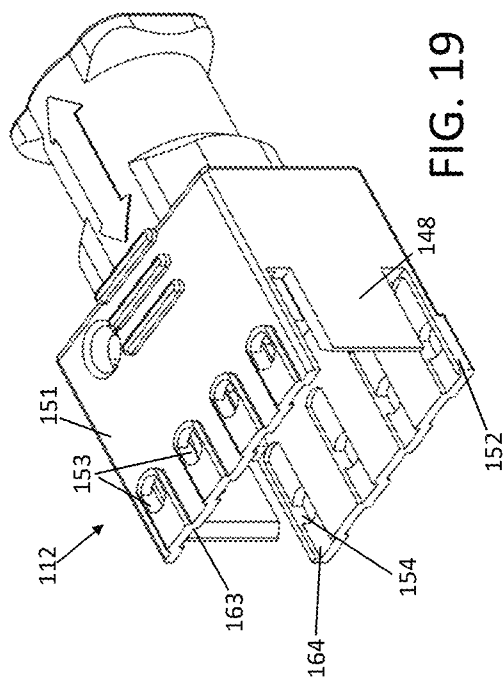
FIG. 19 is a perspective of a rear housing of the connector in an orientation corresponding to the first configuration as shown in FIG. 18.
Figure 22:
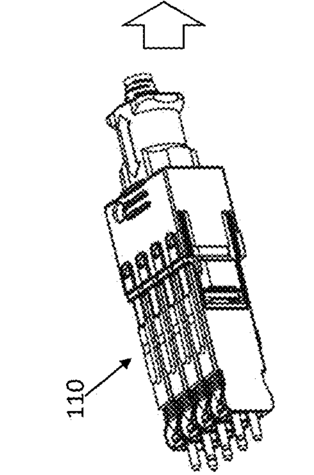
FIGS. 22-27 are a series of perspectives showing a sequence of steps of reconfiguring the connector from the first configuration to the second configuration.
Figure 23:
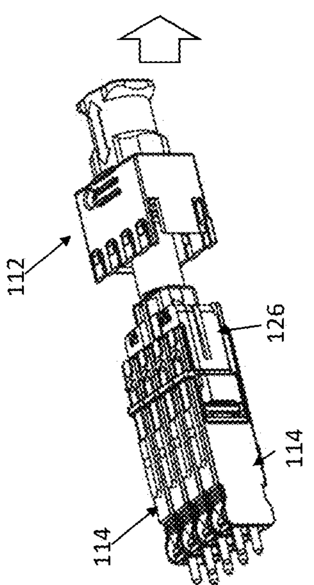
Figure 24:
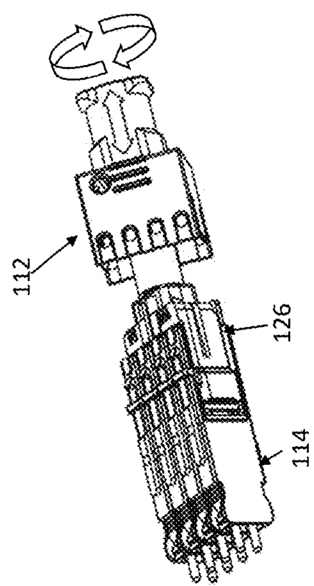
Figure 25:
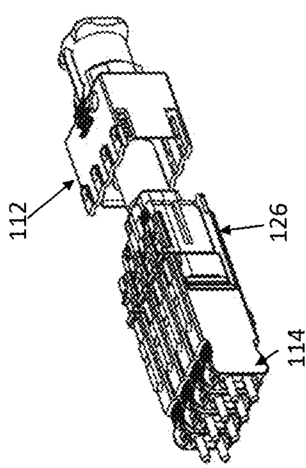
Figure 26:
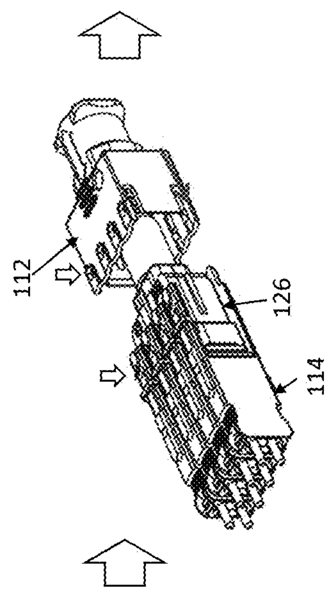
Figure 27:
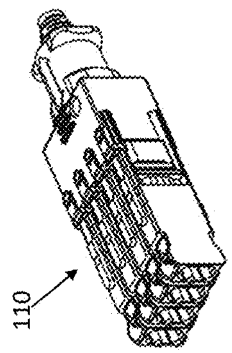

The optical fiber connector 110 is broadly configured to terminate a multi-fiber optical cable (not shown). Referring to FIGS. 12 and 13, in the illustrated embodiment, the one or more housing components of the connector 110 comprise a rear housing 112 and one or more front housings 114. Each front housing 114 is releasably connected with the rear housing 112, and each receives and retains an individual inner connector subassembly 116 therein. Each inner connector subassembly 116 comprises a front ferrule holder 118, first and second optical fiber ferrules 120 spaced apart heightwise, first and second ferrule springs 122 arranged behind the optical fiber ferrules, and a spring push 124 connected to the ferrule holder 118 for compressing the ferrule springs forward against the ferrules 120. The connector 110 further comprises a back body assembly 126 that receives a portion of each spring push 124. The illustrated back body assembly 126 comprises the body base 128, the body lid 130 configured to be fastened to the body base by screws 132 (although other fasteners, such as integral latches, can also be used), and a back post 134 received between the body base and the body lid. The back body assembly 126 is generally configured to be received in the rear housing 112. The illustrated connector 110 further comprises a crimp ring 136 configured to crimp strength members of the cable onto the back post 134 and a cable strain relief boot 138 configured to receive the cable where it enters the connector 110. The rear housing 112 is configured to receive the multifiber cable, and the back body assembly 126 is configured such that a plurality of optical fibers of the multifiber cable are passable through the back body assembly to the ferrules 120 in one or more front housings 114.

Those skilled in the art will recognize that the individual front housings 114 and inner connector subassemblies 116 of the illustrated connector 110 form SN-style plug units. Those skilled in the art will further understand how SN-style plug units latch and unlatch from the adapter, e.g., by displacing the front housings 114 rearward in relation to the inner connector subassemblies 116 to displace adapter latches from corresponding latch recesses of the inner connector subassembly. As explained more fully below, the rear housing 112 is configured to interface with each front housing 114 such that all of the front housings can be simultaneously displaced rearward for unlatching the illustrated connector 110 from the receptacle R1, R2 at once by displacing the rear housing rearward in relation to the back body assembly 126. In other words, the rear housing 112 functions as a slider for simultaneously unlatching individual latched connections between each front housing 114 and the receptacle R1, R2.

It is expressly contemplated that the SN-style plug units can be replaced by other types of plug units corresponding to other connector formats. For example, another connector 210 having dual-receptacle compatibility features, but which uses SN-MT-style plug units, is described below. It is further contemplated that SN-style plug units could be replaced with CS-style, MDC-style, or MMC-style plug units without departing from the scope of the disclosure. In these embodiments, no inner front ferrule holder would be required. Rather each plug unit would be made up of a front housing, one or more ferrules, a ferrule spring for each ferrule, and a spring push that fixedly attaches to the rear end of the front housing. Further, instead of interfacing with the front housings 114 so that the rear housing 112 can simultaneously pull all of the front housings, the rear housing could be configured to interface with the respective pullback unlatch actuators of these types of plug units, which are separate components connected to the front housings in these types of plug units, to facilitate simultaneous unlatching of the plurality of plug units. In other embodiments (not shown), a rear housing may interface with the front housing so that release of the front housings may not occur simultaneously.

In the illustrated embodiment, the connector 110 is generally configured so that the front housings 114 (broadly, the unlatch actuators of the plug units) connect to the rear housing 112 and the spring pushes 124 connect to the back body assembly 126. Moreover, the illustrated connector 110 is broadly configured to adjust from the first configuration to the second configuration by adjusting the positions at which the front housings 114 connect to the rear housing 112 and the positions at which the spring pushes 124 connect to the back body assembly 126. More particularly, the back body assembly 126 is connected to the spring pushes 124 so as to substantially constrain movement of the inner connector subassemblies 116 and front housings 114 in relation to the back body assembly to a limited range of motion that, for each individual front housing 114, includes a first position at which the front housing can define the first configuration of the connector 110 and second position at which the front housing can define the second configuration of the connector.

Without making a connection of the front housings 114 to the rear housing 112, each inner connector subassembly 116 and corresponding front housing is freely adjustable within its corresponding range of motion relative to the back body assembly 126. As explained more fully below, the rear housing 112 is configured to selectively fasten to the front housings 114 in a first orientation at which the rear housing secures the front housings at the first positions corresponding to the first connector configuration and in a second orientation, which is inverted relative to the first orientation, to secure the front housings at the second positions corresponding to the second connector configuration.

Hence, as shown in FIGS. 22-27, the connector 110 is configured to be adjusted form the first configuration to the second configuration, or vice versa, by (i) disconnecting the rear housing 112 from the plurality of front housings 114, (ii) sliding the rear housing 112 backwards, (iii) rotating the rear housing 180 degrees in relation to the front housings, (iv) adjusting the front housings 114 and inner connector subassemblies 116 in relation to the back body assembly 126 from the first positions to the second positions, (v) sliding the rear housing 112 back to the original position, and (vi) reattaching the inverted rear housing to the front housings.

This disclosure will now turn to the details of one exemplary embodiment of an adjustable connection of the inner connector subassemblies 116 to the back body assembly 126. Referring to FIGS. 12-17, the back body assembly 126 comprises a front end portion and a rear end portion spaced apart along a longitudinal axis. The front end portion of the back body assembly 126 defines a plurality of spaced apart adjustment openings 140 (FIG. 13). In detail, the body lid 130 and body base 128 define the adjustment openings 140. The rear end portion of the back body assembly 126 defines a cable opening 141 through which a plurality of optical fibers of the multifiber cable are passable to the adjustment openings 140. Each of the adjustment openings 140 is configured so that a subset of the plurality of optical fibers entering through the cable opening 141 are passable through the adjustment opening 140 to the respective front housing 114. At least a portion of the inner connector assembly 116 is received within the adjustment opening 140 and movable in the width direction.

In the illustrated embodiment, the openings 140 are spaced apart widthwise. Each adjustment opening 140 is configured to receive an individual spring push 124 and sized to allow movement of the spring push 124 in the width direction such that each spring push 124 is slidable in a limited range of motion that includes a first position corresponding with the first configuration of the connector 110 and a second position corresponding with the second configuration of the connector. In other words, the inner connector subassembly 126 is movable between the first position corresponding with the first configuration and second position corresponding with the second configuration.

In the illustrated embodiment, the back body assembly 126 defines a slide bearing at each adjustment opening and the spring push 124 is shaped and arranged to define a slide carriage that is slidably received in the slide bearing such that the spring push 124 is constrained to move only widthwise in relation to the back body assembly. The slide joint between the back body assembly 126 and each spring push 124 prevents the components from disconnecting under longitudinal tension. To make the slide joint, as shown in FIGS. 14-17, each spring push 124 comprises back flange 142 and the back body assembly 126 defines a pair of opposing widthwise grooves 144 at each adjustment opening 140. The opening 140 is sized and shaped to allow the spring push to move along the width direction. Opposite end portions of the back flange 142 are received as slidable tongues in the opposing widthwise grooves 144 of the corresponding adjustment opening when the body base 128 and body lid 130 are fastened together and coupled to each spring push. The grooves 144 define bearing surfaces that constrain the flanges 142 to move by sliding along the groove, i.e., widthwise in relation to the back body assembly 126.

Referring to FIGS. 28-31, this disclosure will now turn to the details of one exemplary embodiment of a releasable connection of the front housings 114 to the rear housing 112 for selectively fixing the front housings at first positions or second positions for defining the first configuration and second configuration of the connector, respectively. In the illustrated embodiment, the same connection features that fix the front housings 114 at the desired widthwise positions also operatively attach the rear housing 112 to the unlatch actuators for simultaneously unlatching all of the front housings from a receptacle. However, it will be understood that connectors in the scope of this disclosure could also have two different points of connection for (i) fixing the front housings at different positions corresponding to the first and second configurations of the dual-receptacle connector and (ii) operatively connecting the rear housing to the individual unlatch actuators associated with each front housing.

The rear housing 112 comprises opposing lateral sidewalls 148 and a first wall 151 and an opposite second wall 152 transverse to the lateral sidewalls. The first wall 151 comprises a first set of attachment points 153 on the first wall and a second set of attachment points 154 on the opposite second wall 152. The rear housing 112 is configured to attach to the front housings 114 at the first set of attachment points 153 to configure the optical fiber connector 110 in the first configuration, and the rear housing is configured to attach to the plurality of front housings at the second set of attachment points 154 to configure the optical fiber connector in the second configuration. The first and second walls 151, 152 form upper and lower walls of the rear housing 112, but which of the first and second walls forms the upper wall and the lower wall will vary depending on whether the rear housing is in the first orientation for defining the first configuration of the connector or the inverted second orientation for defining the second configuration of the connector. In an exemplary embodiment, each attachment point 153, 154 has substantially the same size and shape. In the illustrated embodiment each attachment point 153, 154 is a latch recess on the respective housing wall 151, 152. The attachment points 153, are spaced apart along a width of the rear housing 112, but the second set of attachment points 154 on the second wall 152 are more widely spaced than the first set of attachment points 153 on the first wall 151. As explained below, this difference in attachment point spacing facilitates selective reconfiguring of the connector 110 between the first and second configurations. See also FIGS. 7 and 9.

Referring to FIGS. 19, 21, 30, and 31, the rear housing 112 also comprises additional alignment features for operatively aligning the rear housing with the back body assembly 126 and the front housings 114. With respect to the back body assembly 126, the rear housing comprises symmetrical alignment keys 156 (broadly, alignment formations) on each of the first and second walls 151, 152 and each sidewall 148. The alignment keys 156 are configured to be slidably received in corresponding keyways 158 on the back body assembly 126 in either of the first and second orientations of the rear housing 112 to align the rear housing in relation to the back body assembly. Furthermore, the second wall 152 comprises a first set of rearward alignment recesses 161 (FIG. 31) and the first wall 151 comprises a second set of rearward alignment recesses (not visible in FIG. 31). The first set of rearward alignment recesses 161 are aligned widthwise with the first set of latch recesses 153 on the opposing wall, and the second set of rearward alignment recesses are aligned widthwise with the second set of latch recesses 154. The second set of rearward alignment recesses have the same size, shape, and front-to-back position as the first set of rear alignment recess, differing only by having widthwise spacing corresponding to the widthwise spacing of the second set of latch recesses 154. The inner surface of the first wall 151 further comprises a first set of forward alignment keyways 163 aligned with the latch recesses 153. Likewise, the inner surface of the second wall 152 comprises a second set of forward alignment keyways 164 aligned with the second set of the latch recesses 154.

Figures 30, 31:
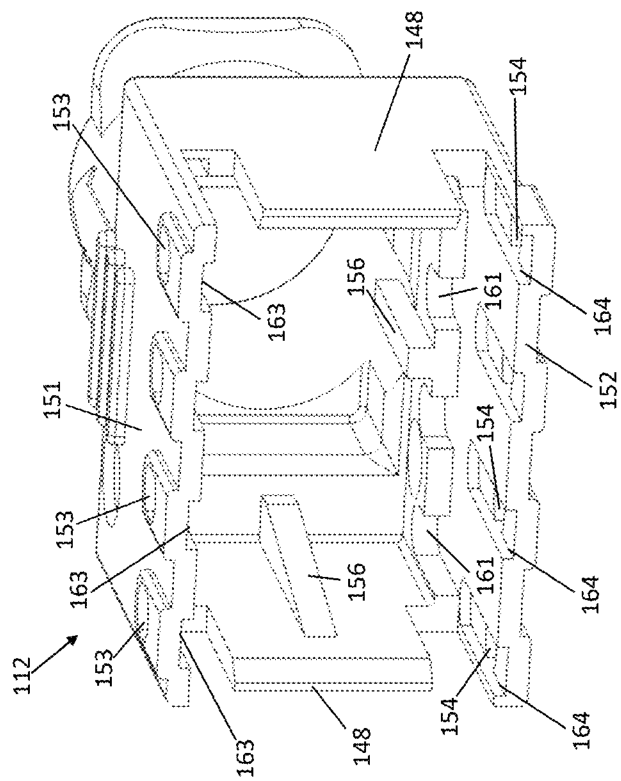
FIG. 30 is a fragmentary perspective of a subassembly of the connector in which the rear housing is removed.
FIG. 31 is a perspective of the rear housing.
Figure 34:
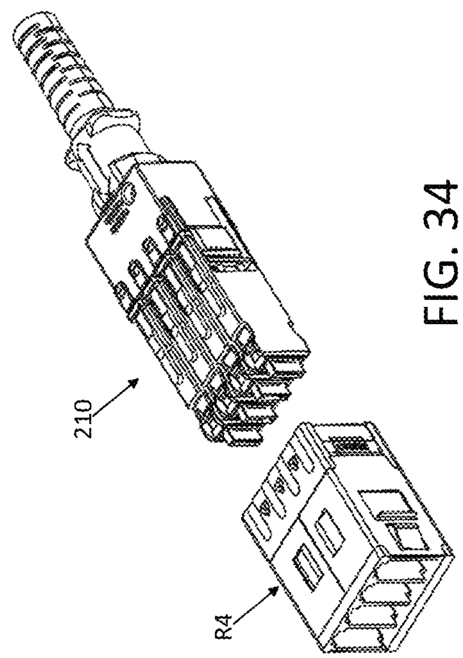
FIG. 34 is a perspective of the multifiber ferrule connector in a second configuration approaching a receptacle of a second type.
Figure 35:
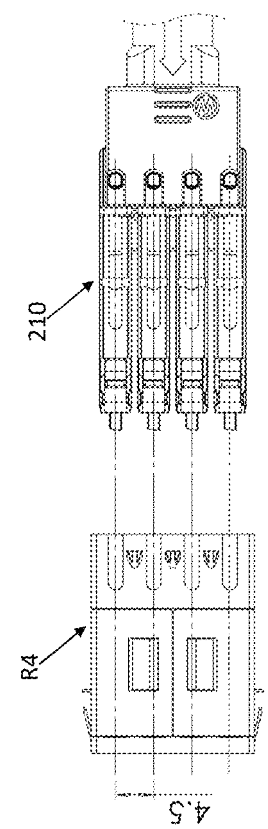
FIG. 35 is a top plan view of the scene in FIG. 34.
Figure 32:
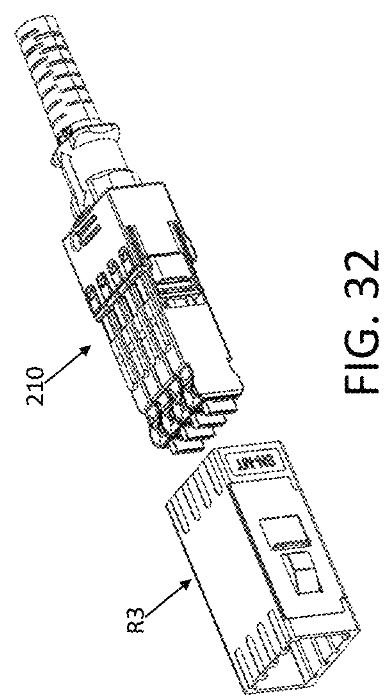
FIG. 32 is a perspective of a second embodiment of an optical fiber connector comprising multifiber ferrules, wherein the multifiber ferrule connector is shown in a first configuration approaching a receptacle of a first type.
Figure 33:
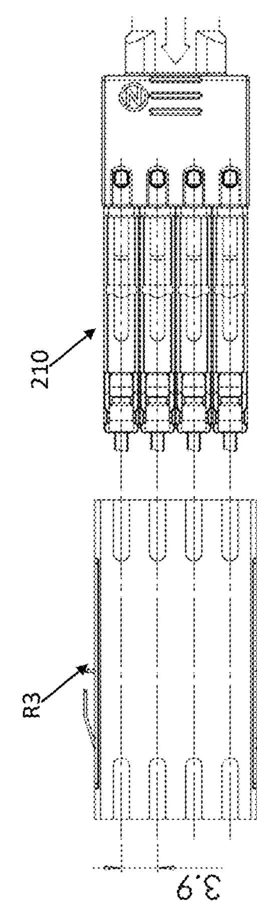
FIG. 33 is top plan view of the scene in FIG. 32.
Figure 36:
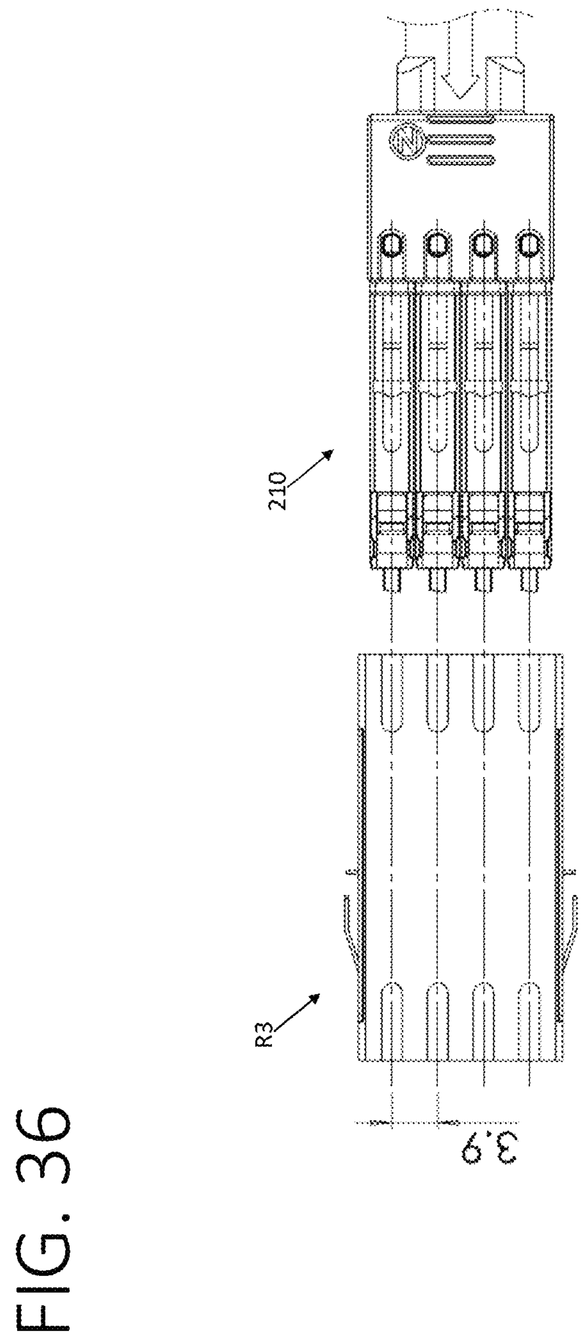
FIG. 36 is another top plan view similar to FIG. 33.
Figure 37:
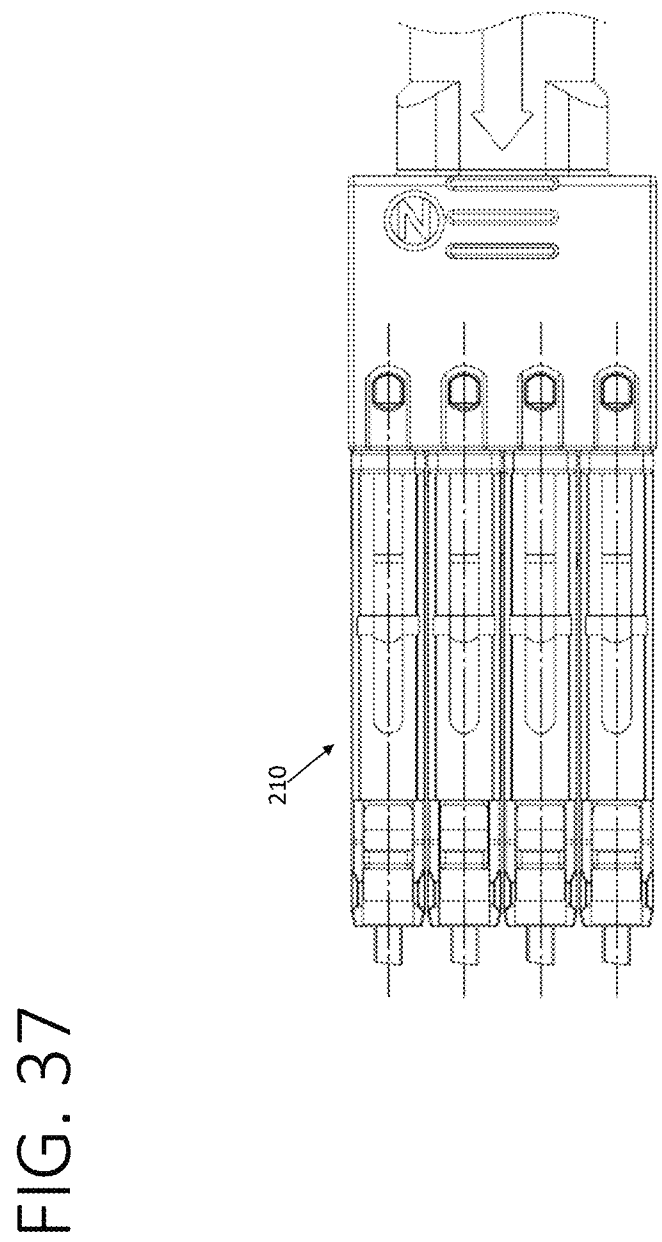
FIG. 37 is a top plan view of the multifiber ferrule connector in the first configuration.
Figure 38:
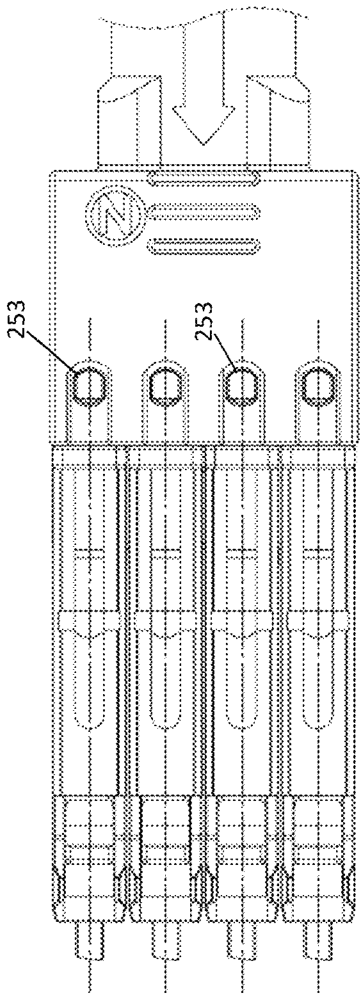
FIG. 38 is another top plan view of the multifiber ferrule connector in the first configuration.
Figure 39:
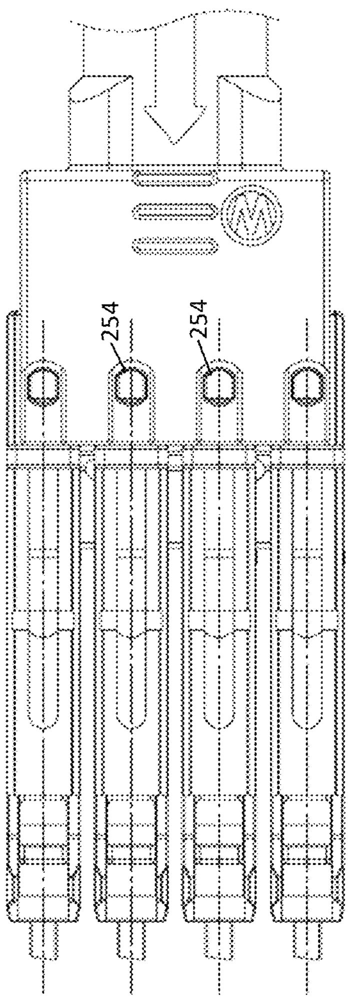
FIG. 39 is a top plan view of the multifiber ferrule connector in the second configuration.

Referring to FIGS. 13 and 30, the front housings 114 have top and bottom walls 171, 172 and open sidewalls 174 between the top and bottom walls along the rear section of each front housing. The open sidewalls 174 provide space for receiving the back body assembly 126 and sidewalls 148 of the rear housing 112. The rear section of each top wall 171 comprises an alignment key 175 and a latch protrusion 176. The rear end portion of the bottom wall 172 forms an alignment extension 178 that is rearward of the rear end of the top wall. In general, the alignment keys 175 are configured to be selectively received in either set of forward alignment keyways 163, 164, the latch protrusions 176 are configured to selectively latch with the corresponding set of latch recesses 153, 154, and the alignment extensions 178 are configured to be received in the opposing set of rearward alignment recesses (e.g., recesses 161). The latch protrusions 176 latched with either set of latch recesses 153, 154 couple the front housings 114 to the rear housing 112 such that the rear housing can be displaced rearward in relation to the back body assembly 126, thereby simultaneously displacing each of the front housings rearward in relation to the inner connector assemblies 116 to actuate the unlatch mechanism of each front housing.

Figure 1:
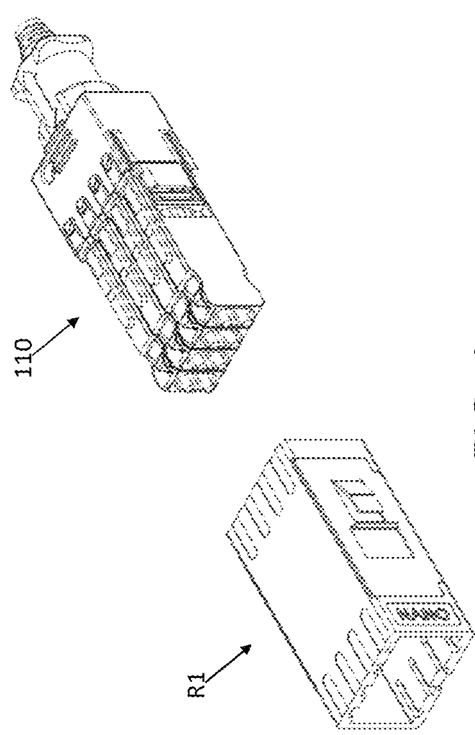
FIG. 1 is a perspective of a first embodiment of an optical fiber connector in a first configuration approaching a receptacle of a first type.
Figure 2:
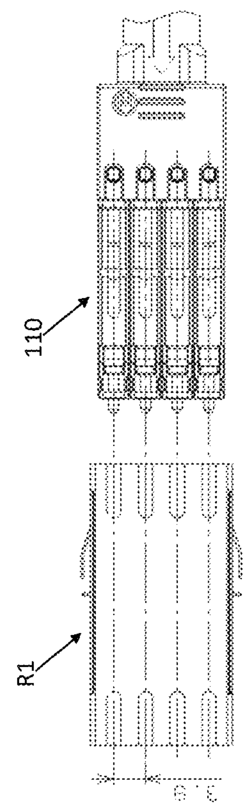
FIG. 2 is top plan view of the scene in FIG. 1.
Figure 3:
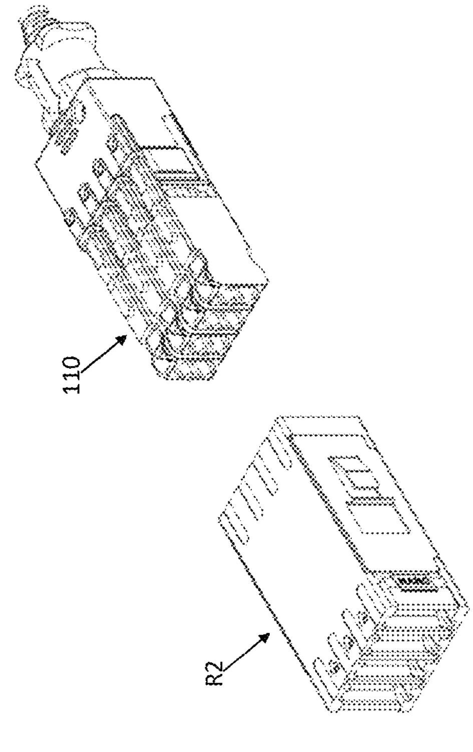
FIG. 3 is a perspective of the connector in a second configuration approaching a receptacle of a second type.
Figure 4:
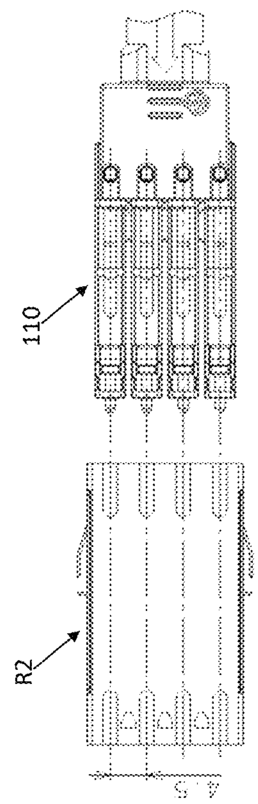
FIG. 4 is a top plan view of the scene in FIG. 3.
Figure 5:
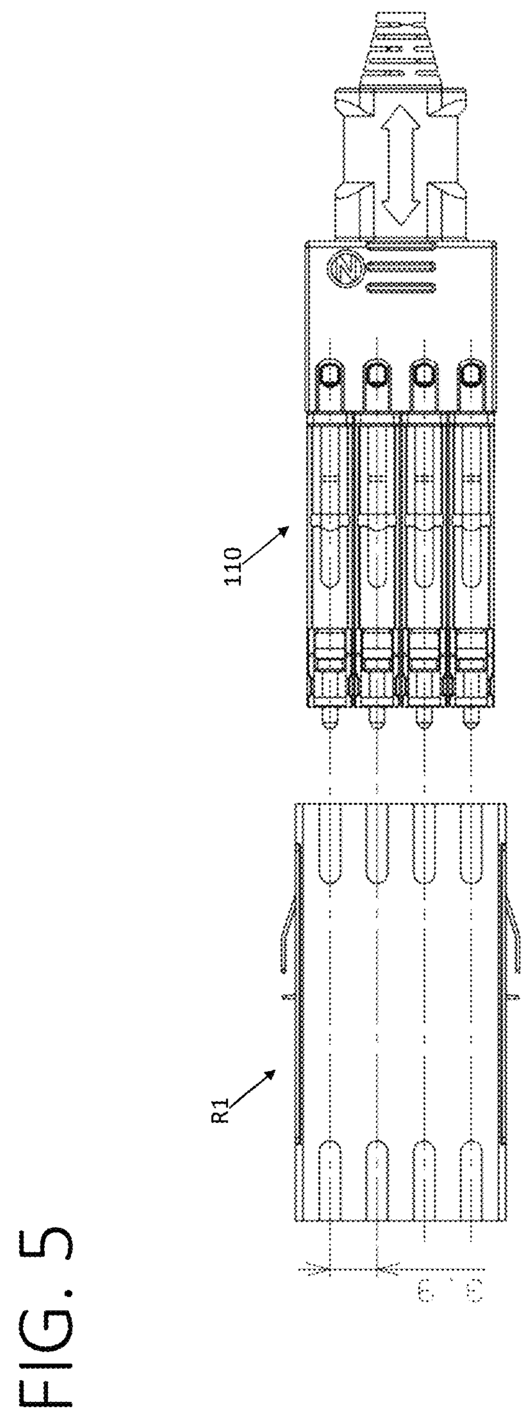
FIG. 5 is another top plan view similar to FIG. 2.
Figure 6:
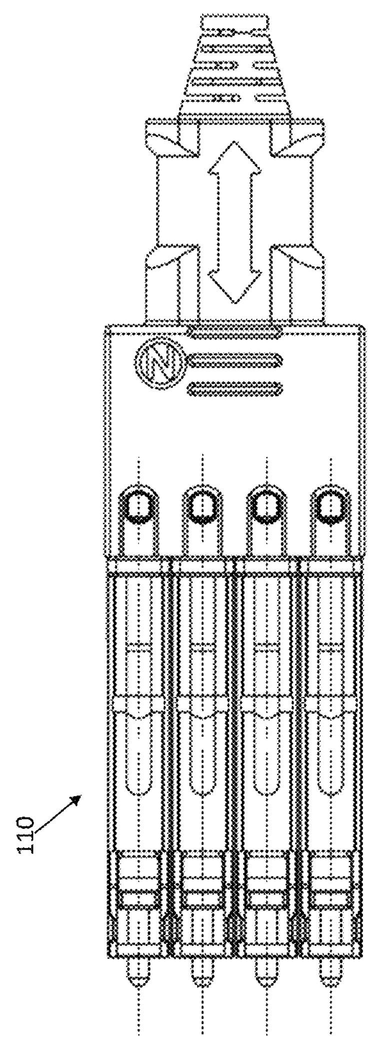
FIG. 6 is a top plan view of the connector in the first configuration.
Figure 7:
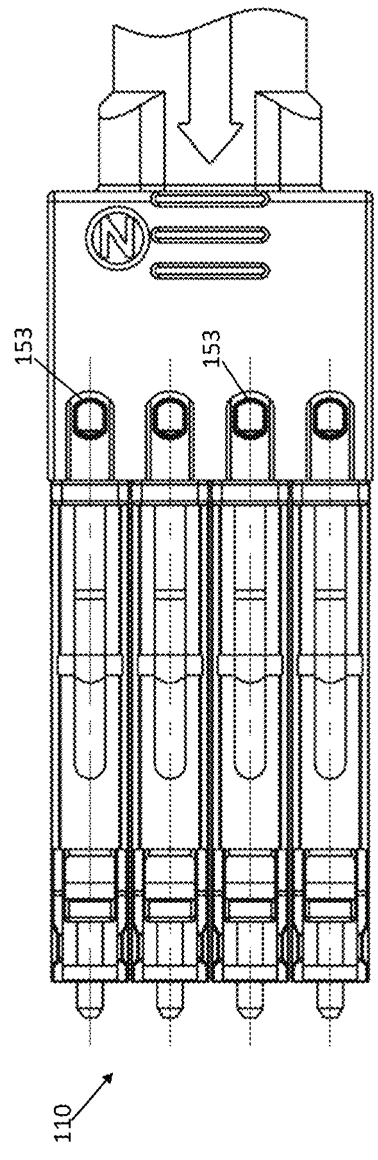
FIG. 7 is another top plan view of the connector in the first configuration.
Figure 8:
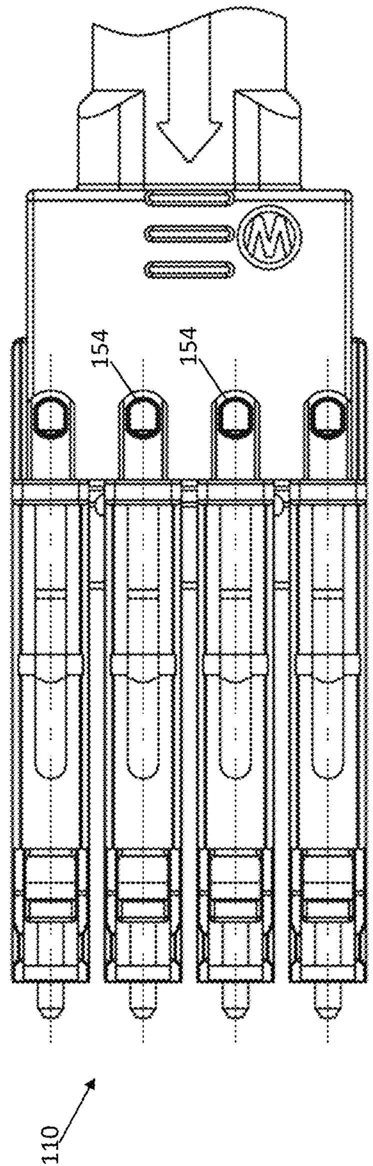
FIG. 8 is a top plan view of the connector in the second configuration.
Figure 9:
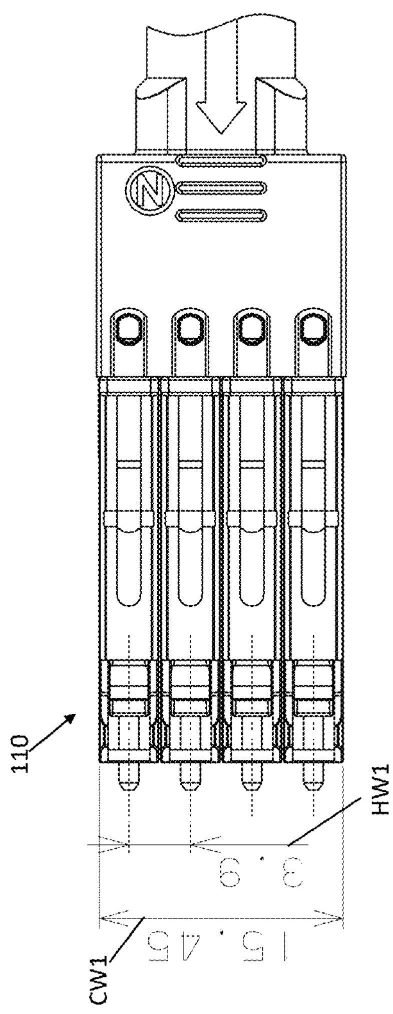
FIG. 9 is another top plan view of the connector in the first configuration.

A method of selectively adjusting the connector 110 in the first and second configurations for mating with the first and second types of receptacles R1, R2, will now be briefly described. The top and bottom walls 171, 172 of the front housings 114 define the frame of reference for orientation of components in this description. For purposes of explanation, the method begins with the rear housing disconnected from the front housings 116. From this starting point, the rear housing 112 is rotated about the cable to a first orientation with the first wall 151 above the second wall 152, and the front housings 114 are slidably adjusted in relation to the back body assembly 126 to the respective first positions. Then, the rear housing 112 is advanced forward onto the back body assembly 126. The alignment keys 156 slide into corresponding keyways 158 on the back body assembly 126 to align the rear housing 112 in relation to the back body assembly. The alignment keys 175 of the front housings 116 are likewise slidably received in the forward alignment keyways 163 on the first wall 151 of the rear housing 112 until the alignment extensions 178 are received in the corresponding rearward alignment recesses 161 and the latch protrusions 176 latch with the first set of latch recesses 153. Then the connector 110 is configured in the first configuration. As shown in FIG. 9, in the first configuration, the connector 110 has a first on-center widthwise housing-to-housing spacing HW1, e.g., HW1 is about 3.9 mm. In addition, the connector has a first connector width CW1, e.g., CW1 is about 15.45 mm.

Figure 10:
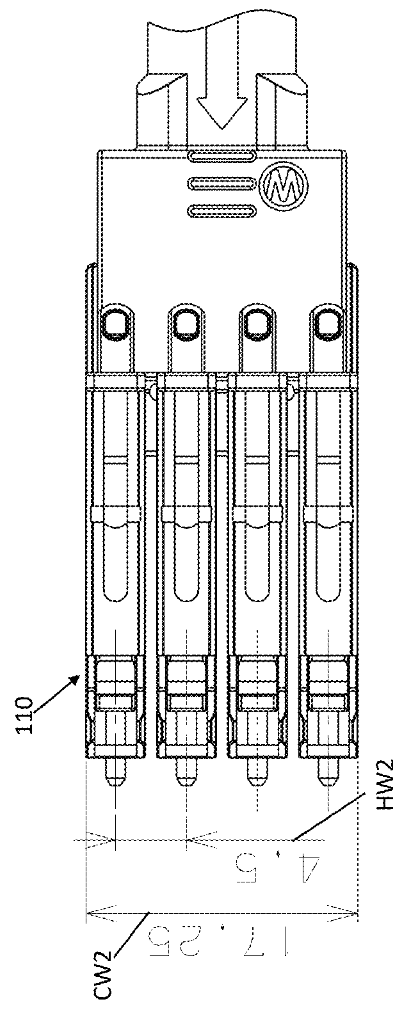
FIG. 10 is another top plan view of the connector in the second configuration.
Figure 11:
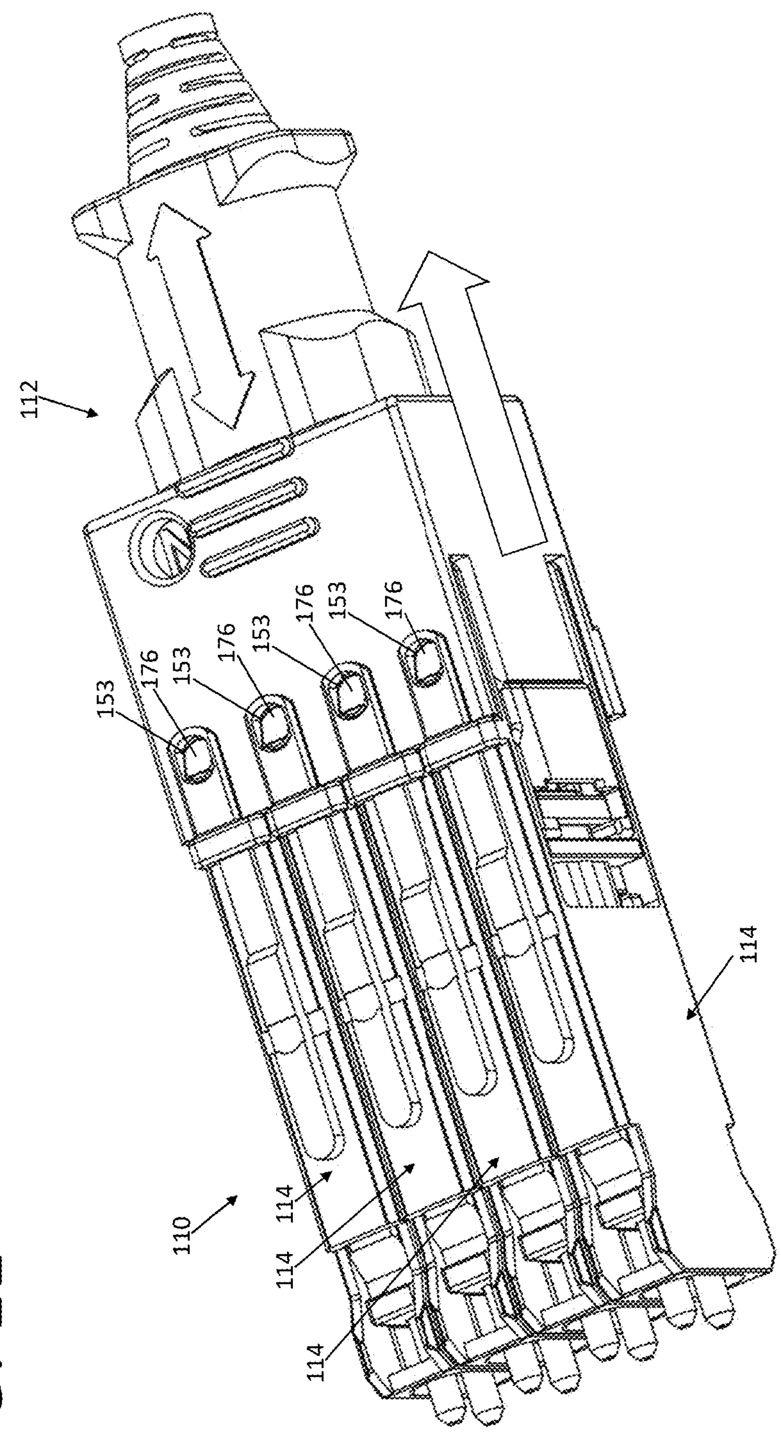
FIG. 11 is another perspective of the connector in the first configuration.
Figure 28:
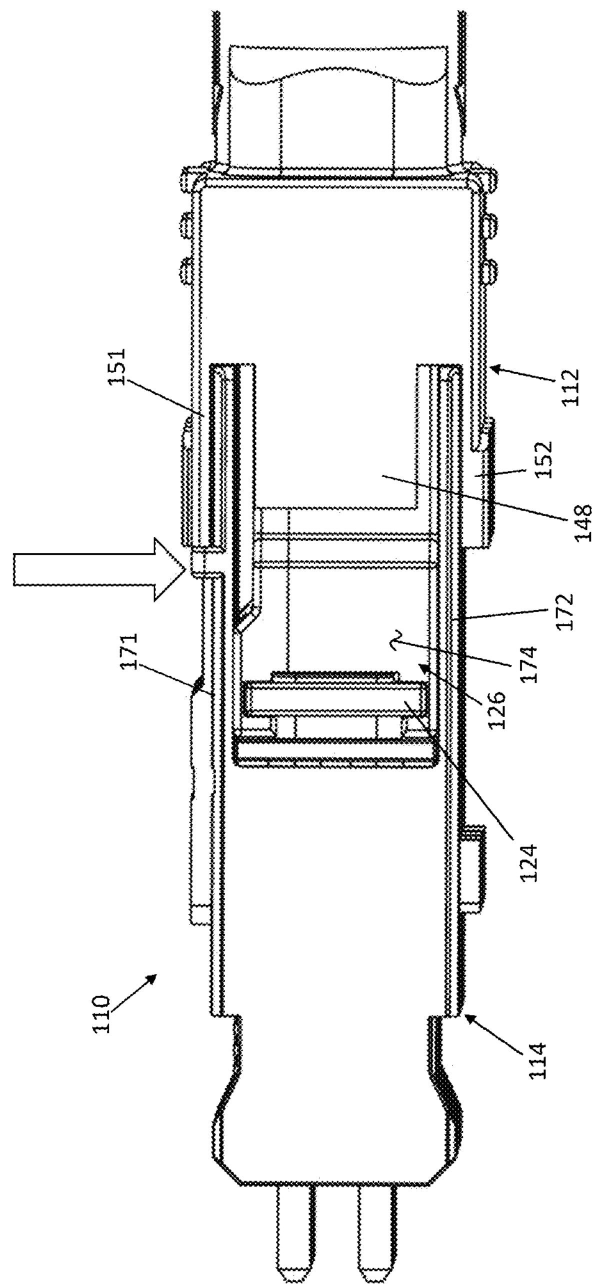
FIG. 28 is an elevation of the connector.
Figure 29:
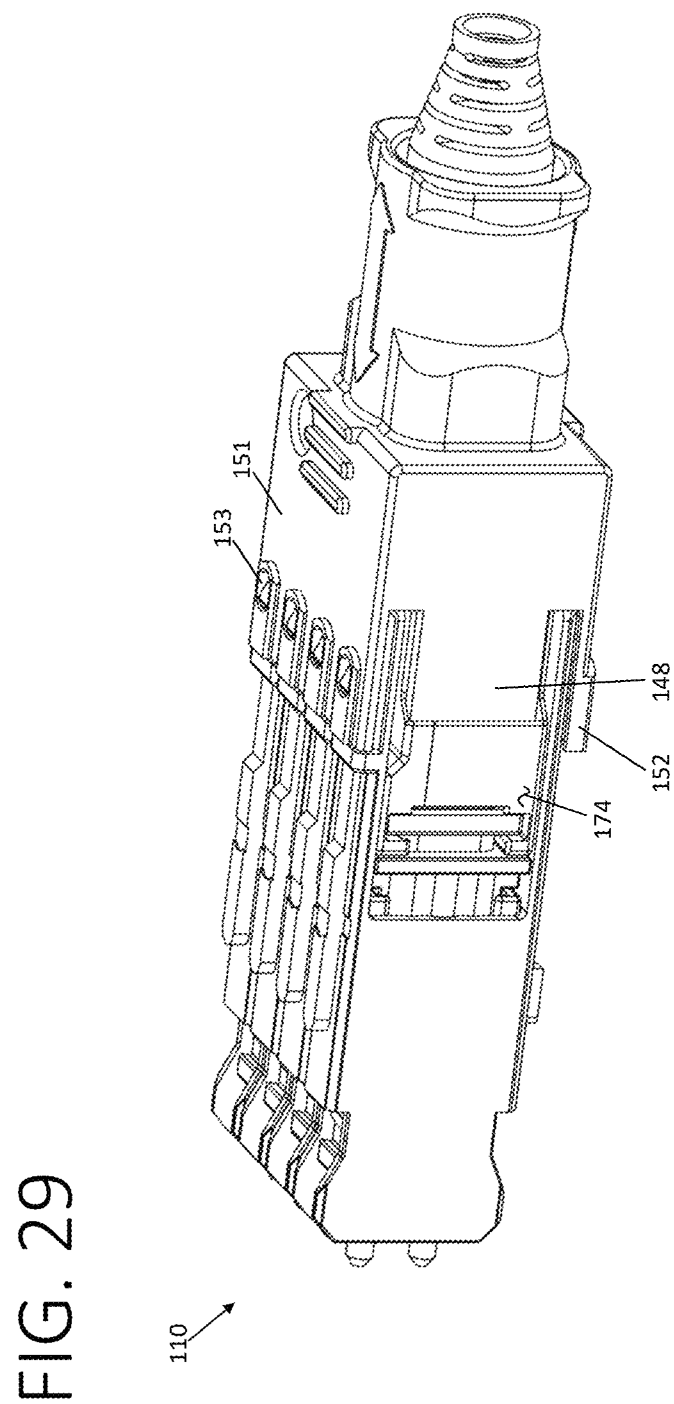
FIG. 29 is another perspective of the connector.

To selectively adjust the connector 110 from the first configuration to the second configuration, the user presses down on the upper walls 171 of the front housings 114, flexing the upper walls to unlatch the latch protrusions 176 from the first set of latch recesses 153. The user then pulls the rear housing 112 rearward (FIG. 28). Then the rear housing 112 is rotated about the cable to the inverted second orientation with the second wall 152 above the first wall 151, and the front housings 114 are slidably adjusted in relation to the back body assembly 126 to the respective second positions. Next, the rear housing 112 is pushed forward onto the back body assembly 126. The alignment keys 156 slide into corresponding keyways 158 on the back body assembly 126 to position the back body assembly in the rear housing. The alignment keys 175 of the front housings 116 are likewise slidably received in the forward alignment keyways 164 on the second wall 152 of the rear housing 112 until the alignment extensions 178 are received in the corresponding rearward alignment recesses (not shown) and the latch protrusions 176 latch with the second set of latch recesses 154. then the connector 110 is configured in the second configuration. As shown in FIG. 10, in the second configuration, the connector 110 has a second on-center widthwise housing-to-housing spacing HW2 greater than the first spacing HW1, e.g., HW2 is about 4.5 mm. In addition, the connector 110 has a first connector width CW1, e.g., CW1 is about 17.25 mm. Those skilled in the art could understand that the first spacing HW1 may be larger or smaller than 3.9 mm and likewise the second spacing HW2 may be larger or smaller than 4.5 mm, as long as the first spacing HW1 is different from the second spacing HW2.

In one or more embodiments, HW1 is less than 4.2 mm and HW2 is greater than 4.2 mm. In certain embodiments, HW1 is at least 0.1 mm less than HW2 (e.g., at least 0.2 mm less than HW2, at least 0.3 mm less than HW2, at least 0.4 mm less than HW2, at least 0.5 mm less than HW2). In one or more embodiments, CW1 is less than 16.2 mm and CW2 is greater than 16.2 mm. In certain embodiments, CW1 is at least 0.4 mm less than CW2 (e.g., at least 0.8 mm less than CW2, at least 1.2 mm less than CW2, at least 1.6 mm less than CW2).

Referring to FIGS. 32-60, another exemplary embodiment of an optical fiber connector in the scope of this disclosure is generally indicated at reference number 210. The connector 210 is similar to the connector 110 in most respects, and corresponding parts are given the same reference number, plus 100. Essentially, the connector 210 differs from the connector 110 in that, where two single-fiber ferrules 120 were used in the connector 110, a single multifiber ferrule 220 is used in the connector 210. Other than changes to the size and shape of various components to accommodate the differences in ferrules, the mutifiber ferrule connector 210 has essentially the same parts, with essentially the same functions. As shown in FIGS. 43-44A, multifiber ferrules 220, 220' with different numbers of fibers can be used with the connector 210. Each multifiber ferrule can comprise at least one vertical row of four or more fibers. In the illustrated embodiment, the multifiber ferrule 220 comprises one vertical row of eight fibers, and the multifiber ferrule 220' comprises one vertical row of sixteen fibers.

The connector 210 is selectively adjustable between a first configuration, shown in FIGS. 32, 33, 36, 37, 38, and 40, and a second configuration, shown in FIGS. 34, 35, 39, and 41. In the first configuration, the housing components 212, 214 hold the ferrules 220 in a first ferrule arrangement and the connector 210 is mateable with a receptacle R3 of a first type, shown in FIGS. 32 and 33. In the second configuration, the housing components 212, 214 hold the ferrules 220 in a second ferrule arrangement and the connector 210 is mateable with a receptacle R4 of a second type, shown in FIGS. 34 and 35. The ferrule spacing differs in the first ferrule arrangement and the second ferrule arrangement, allowing for optical compatibility with both types of receptacle R3, R4. In addition, the connector 210 has a first connector width CW3 (FIG. 40) in the first configuration and a second connector width CW4 (FIG. 41) in the second configuration, wherein the second connector width is greater than the first, again allowing for compatibility with two types of receptacles R3, R4.

As above, the illustrated first type of receptacle R3 has a plurality of channels (e.g., each channel supports at least one pair of Tx-Rx signals) undivided by partition walls and the illustrated second type of receptacle R4 comprises partition walls. The first type of receptacle R3 is also less wide than the second type of receptacle R4. The first type of receptacle R3 is also shutter-less, whereas the second type of receptacle includes one or more shutters (e.g., one or more shutter elements-per-channel).

Figure 45A:
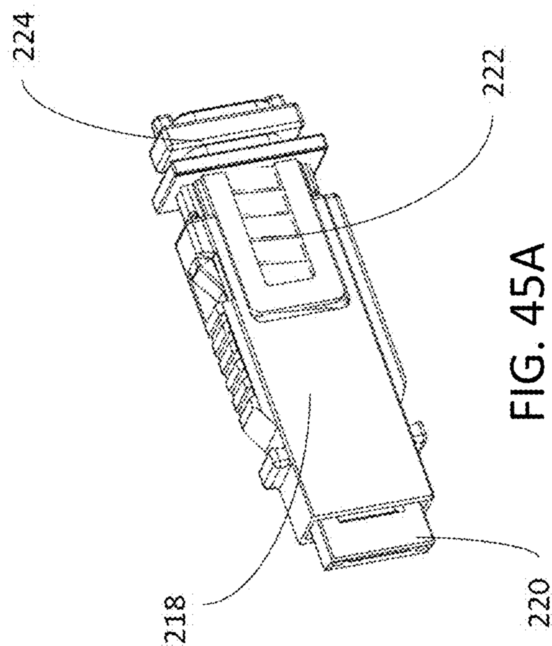
FIG. 45A is a perspective of the inner connector subassembly.
Figure 45B:
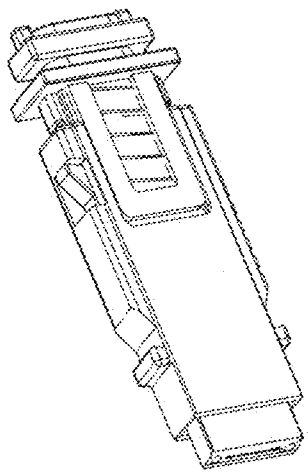
FIG. 45B is another perspective of an inner connector subassembly.
Figure 45:
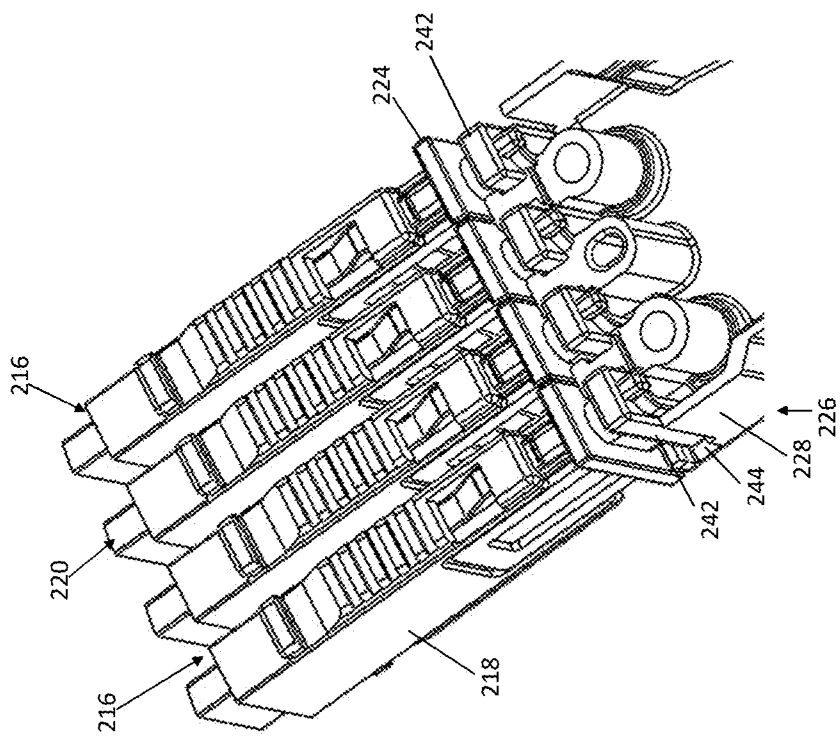
FIG. 45 is a fragmentary perspective of a subassembly of the multifiber ferrule connector including a back body base and a plurality of inner connector subassemblies.
Figure 46:
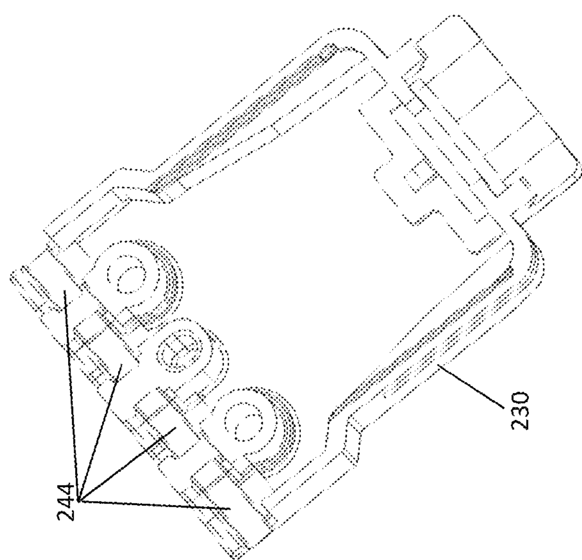
FIG. 46 is a perspective of a back body lid of the multifiber ferrule connector.
Figure 48:
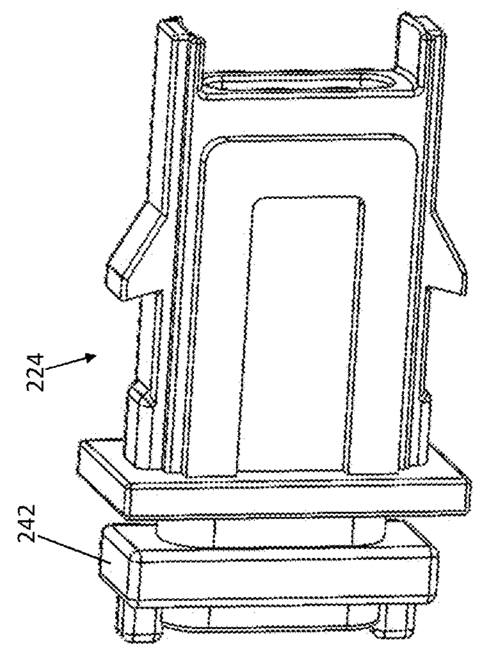
FIG. 48 is a perspective of the spring push of FIG. 47.
Figure 47:
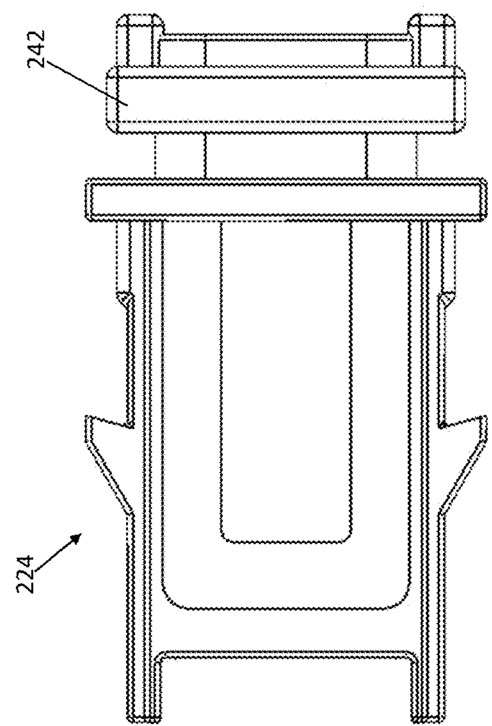
FIG. 47 is an elevation of a spring push of the multifiber ferrule connector.
Figure 51:
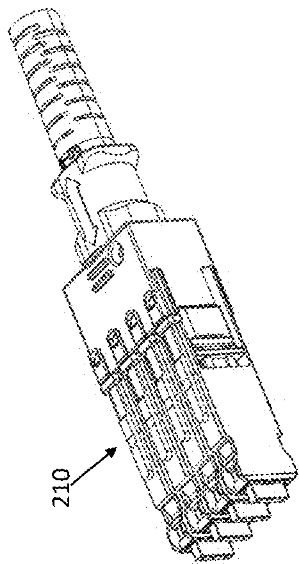
FIG. 51 is another perspective of the multifiber ferrule connector in the second configuration.
Figure 52:
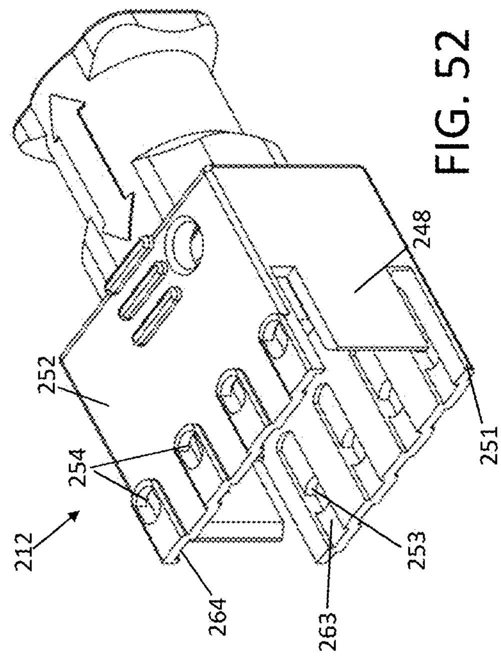
FIG. 52 is a perspective of the rear housing in a second, inverted orientation corresponding to the second configuration as shown in FIG. 51.
Figure 49:
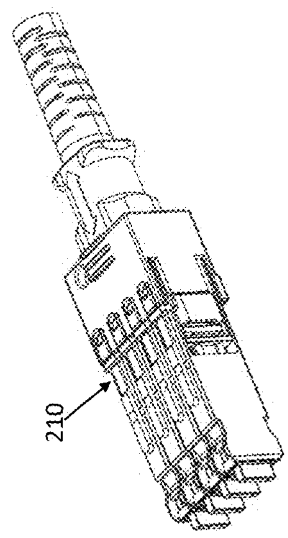
FIG. 49 is another perspective of the multifiber ferrule connector in the first configuration.
Figure 50:
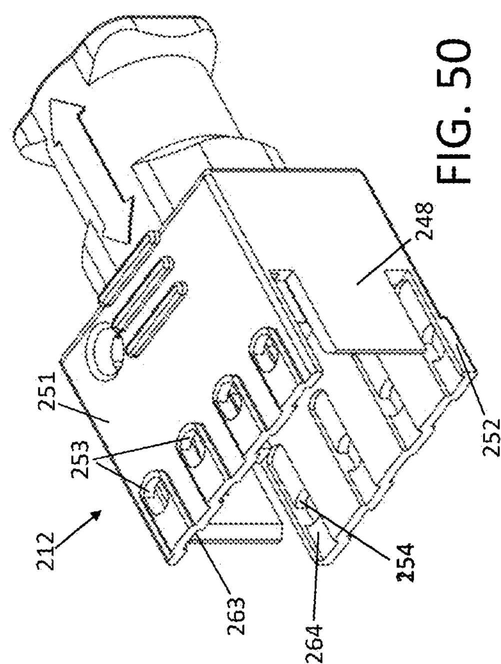
FIG. 50 is a perspective of a rear housing of the multifiber ferrule connector in an orientation corresponding to the first configuration as shown in FIG. 49.

The optical fiber connector 210 is broadly configured to terminate a multi-fiber optical cable (not shown). Each front housing 214 receives and retains an individual inner connector subassembly 216 (FIG. 45) therein. Each inner connector subassembly 216 as shown in FIGS. 45A and 45B comprises a front ferrule holder 218, the multifiber ferrule 220 configured to be accommodated in the ferrule holder and protrude from a front end of the holder, a single ferrule spring 222, and a spring push 224. The ferrule spring 222 is positioned between the front ferrule holder 218 and the spring push 224 for compressing the ferrule spring forward against the ferrule. The connector 210 further comprises a back body assembly 226 that receives a portion of each spring push 224 and each spring push 224 is movable in the width direction with respect to the back body assembly. The illustrated back body assembly 226 comprises a body base 228 (FIG. 45) and a body lid 230 (FIG. 46) configured to be fastened to the body base. The body base and body lid define opposing grooves 244 which form an opening. As above, a back post (not shown) may be received between the body base 228 and the body lid 230, a crimp ring (not shown) may be configured to crimp strength members of the cable onto the back post, and a cable strain relief boot (not shown) may be configured to receive the cable where it enters the connector 210.

As with the connector 110, the connector 210 is generally configured so that the front housings 214 (broadly, the unlatch actuators of the plug units) releasably connect to the rear housing 212 and the spring pushes 224 adjustably connect to the back body assembly 226. The back body assembly 226 defines a plurality of spaced apart adjustment openings 240 spaced apart widthwise, each configured to slidably receive the flange 242 of an individual spring push 224 in a groove 244 such that each spring push 224 is slidable along the width of the connector 210 in a limited range of motion that includes a first position corresponding with the first configuration of the connector 210 and a second position corresponding with the second configuration of the connector.

Like the rear housing 112 of the connector 110, the rear housing 212 is configured to attach to the front housings 214 at a first set of attachment points 253 to configure the optical fiber connector 210 in the first configuration, and the rear housing is configured to attach to the plurality of front housings at the second set of attachment points 254 to configure the optical fiber connector in the second configuration. Here again, the first attachment points 253 comprise latch recesses spaced apart along the width of the first wall 251 and the second set of attachment points 254 comprise latch recesses spaced apart along the width of the second wall 252, wherein the second attachment points are more widely spaced than the first. The front housings 214 comprise upper and lower walls 271, 272, with open sidewalls 274 between the upper and lower walls along the rear sections of the housings. As above, the upper wall 272 defines latch protrusions 276 for latching with the latch recesses 253, 254 on either wall 251, 252 of the rear housing to selectively secure the front housings 214 in first positions corresponding to the first configuration of the connector 210 or second positions corresponding to the second configuration of the connector. The rear housing 212 can have all of the same features for aligning with the front housings 214 and back body assembly 226 as the rear housing 112 has for aligning with the front housings 114 and the back body assembly 126. For example, the forward alignment keyways 263, 264 are visible in FIGS. 50 and 52. Similarly, the front housings 214 and back body assembly 226 likewise can have the same alignment features as the front housings 114 and back body assembly 226 described above.

Figure 40:
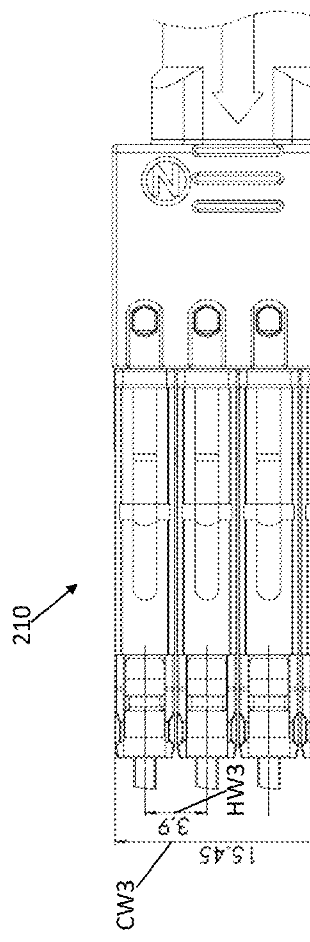
FIG. 40 is another top plan view of the multifiber ferrule connector in the first configuration.
Figure 53:
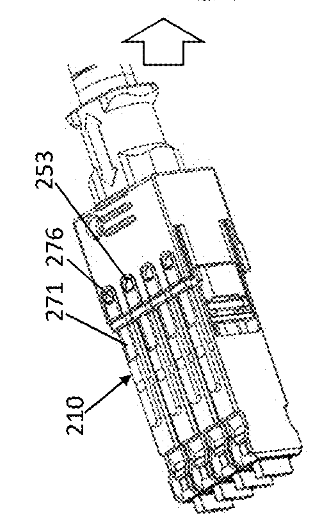

Referring to FIGS. 53-58, the steps of selectively adjusting the connector 210 between the first and second configurations for mating with the first and second receptacles R3, R4, will now be briefly described. In FIG. 53, the connector 210 is shown in a first configuration suitable for mating with a first receptacle R3. As shown in FIG. 40, in the first configuration, the connector 210 has a first on-center widthwise housing-to-housing spacing HW3, e.g., HW3 is about 3.9 mm. In addition, the connector has a first connector width CW3, e.g., CW3 is about 15.45 mm.

Figure 41:
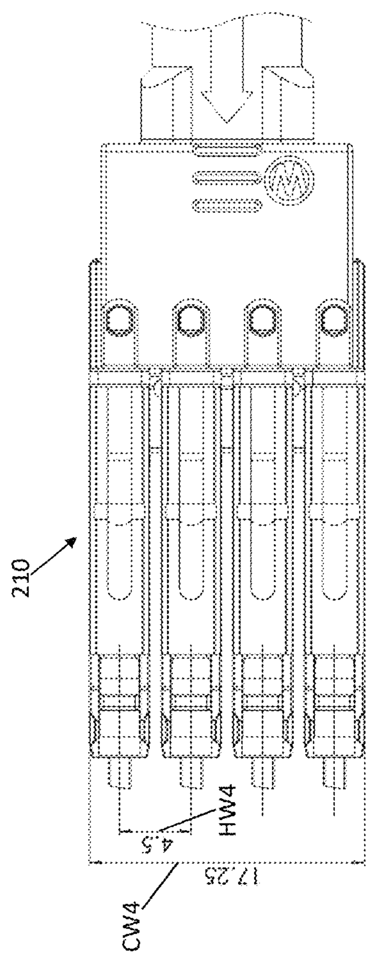
FIG. 41 is another top plan view of the multifiber ferrule connector in the second configuration.
Figure 42:
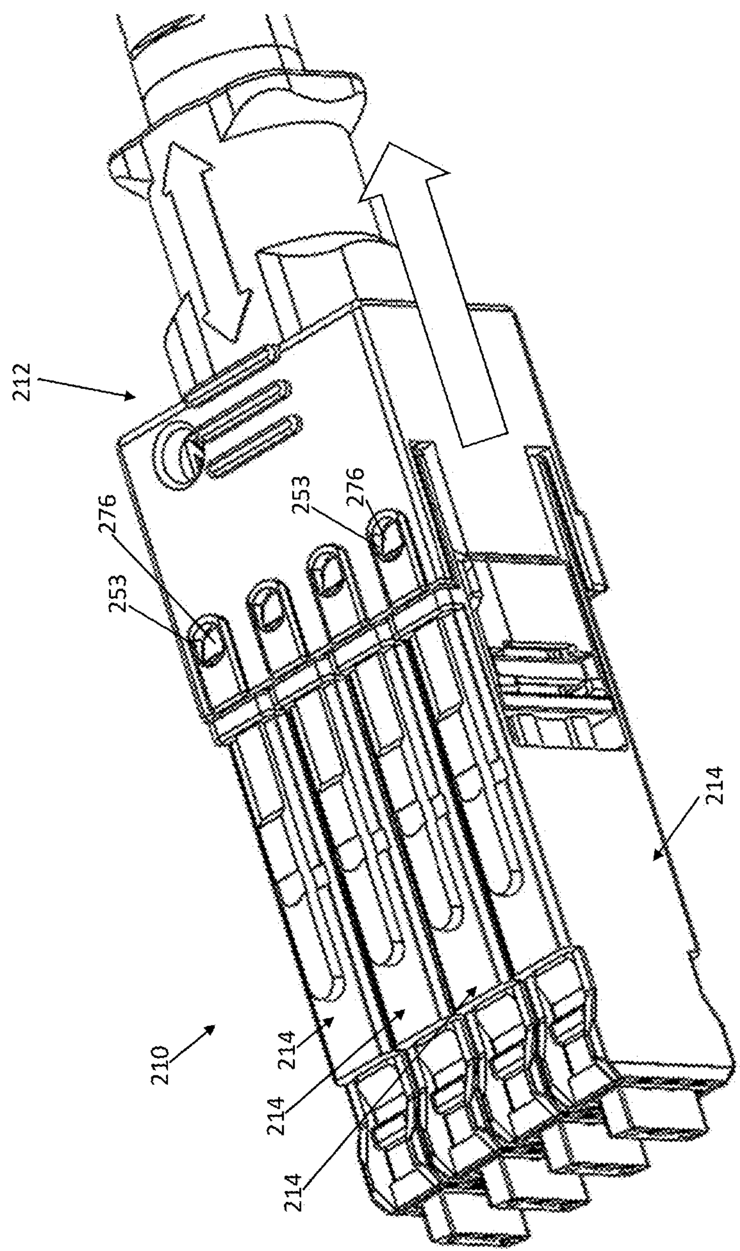
FIG. 42 is another perspective of the multifiber ferrule connector in the first configuration.
Figure 55:
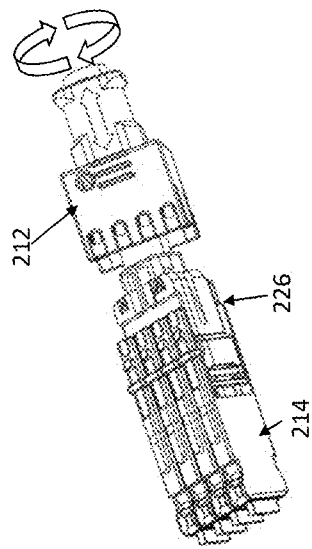
FIGS. 53-58 are a series of perspectives showing a sequence of steps of reconfiguring the multifiber ferrule connector from the first configuration to the second configuration.
Figure 58:
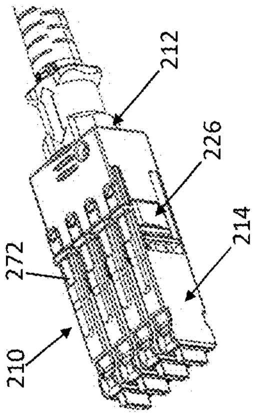
Figure 54:
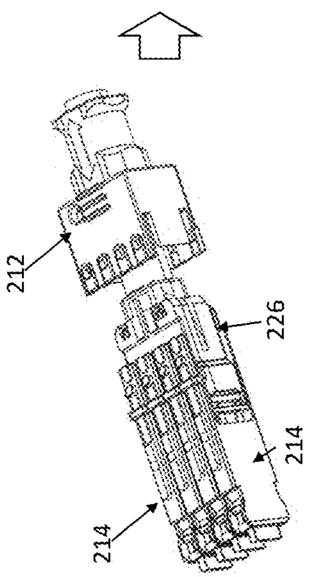
Figure 57:
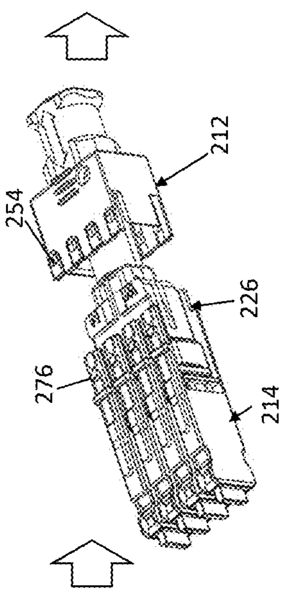
Figure 56:
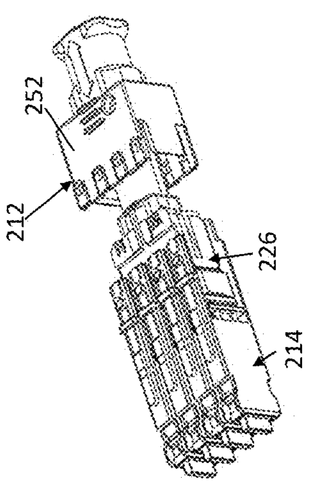
Figure 59:
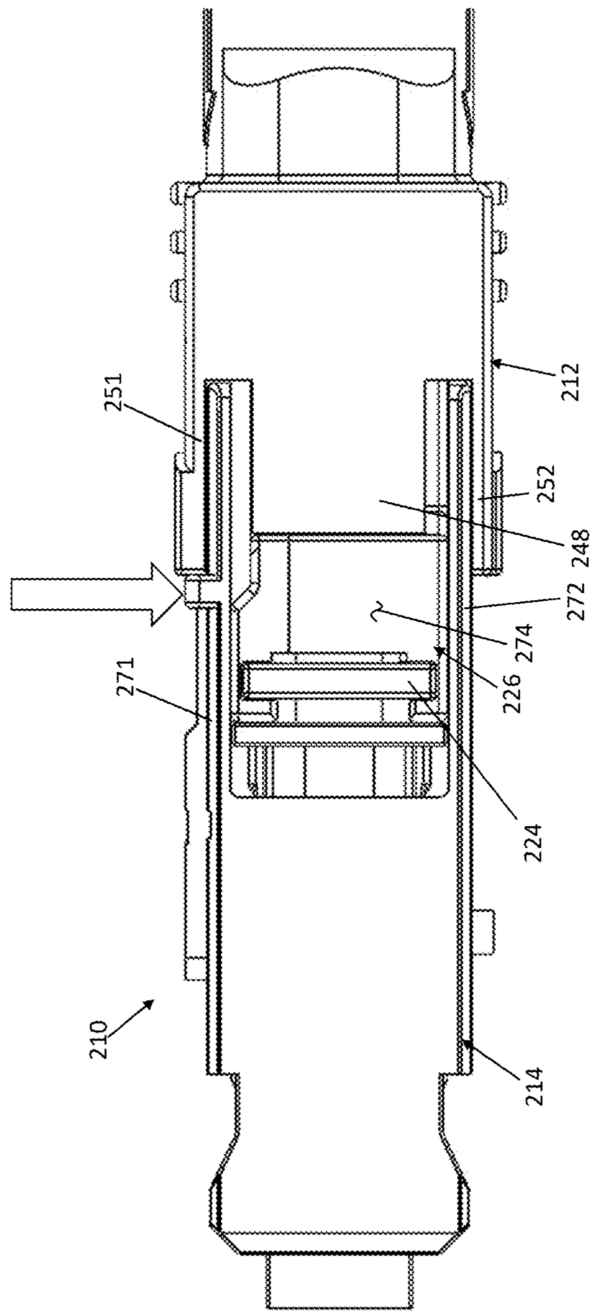
FIG. 59 is an elevation of the multifiber ferrule connector.
Figure 60:
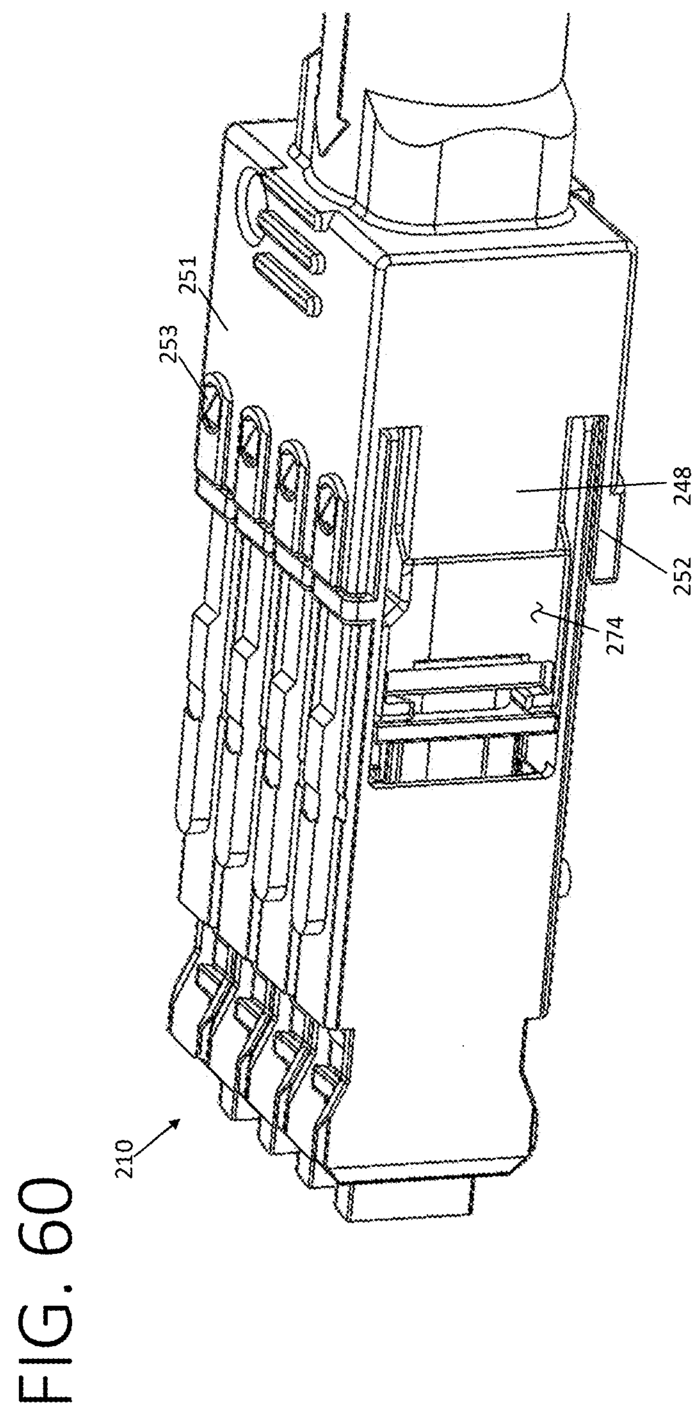
FIG. 60 is another perspective of the multifiber ferrule connector.

To selectively adjust the connector 210 from the first configuration to the second configuration, the user presses down on the upper walls 271 of the front housings 216, flexing the upper walls to unlatch the latch protrusions 276 from the first set of latch recesses 253. The user then pulls the rear housing 212 away rearward (FIG. 54). Then as shown in FIGS. 55-56, the rear housing 212 is rotated about the cable to the inverted second orientation with the second wall 252 above the first wall 251, and the inner connector subassembly 216 and front housings 214 are slidably adjusted in relation to the back body assembly 226 to the respective second positions. Next, as shown in FIGS. 57-58, the rear housing 212 is pushed forward onto the back body assembly 226. The various alignment features of the rear housing 212, back body assembly 226, and front housings 214 operatively align the rear housing with the front housings until the latch protrusions 276 latch with the second set of latch recesses 254. The connector 210 is configured in the second configuration. As shown in FIG. 41, in the second configuration, the connector 210 has a second on-center widthwise housing-to-housing spacing HW4 greater than the first spacing HW3, e.g., HW4 is about 4.5 mm. In addition, the connector 210 has a first connector width CW3, e.g., CW3 is about 17.25 mm.

In one or more embodiments, HW3 is less than 4.2 mm and HW4 is greater than 4.2 mm. In certain embodiments, HW3 is at least 0.1 mm less than HW4 (e.g., at least 0.2 mm less than HW4, at least 0.3 mm less than HW4, at least 0.4 mm less than HW4, at least 0.5 mm less than HW4). In one or more embodiments, CW3 is less than 16.2 mm and CW4 is greater than 16.2 mm. In certain embodiments, CW3 is at least 0.4 mm less than CW4 (e.g., at least 0.8 mm less than CW4, at least 2.2 mm less than CW4, at least 2.6 mm less than CW4).

As can be seen, the above-described connectors 110, 210 enable the same single-cable, multi-ferrule connector to be used with two different types of receptacles.

The connectors 110, 210 may be referred to as very small form factor (VSFF) uniboot connectors. U.S. patent application Ser. No. 17/937,006, filed Sep. 30, 2022, and entitled FIBER OPTIC NETWORK SYSTEMS, describes numerous applications for VSFF uniboot connectors like connectors 110, 210 in high density fiber optic networks. U.S. patent application Ser. No. 17/937,006 is hereby incorporated by reference in its entirety.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. An optical fiber connector, the optical fiber connector having a longitudinal axis, the optical fiber connector comprising:

a plurality of optical fiber ferrules;

at least one front housing, each front housing configured for holding one or more of the optical fiber ferrules; and a rear housing configured to be releasably connected to the at least one front housing in either of a first configuration and a second configuration, wherein in the first configuration, the optical fiber ferrules define a first width, and wherein in the second configuration, the optical fiber ferrules define a second width, wherein the first width is different from the second width; and wherein the optical fiber connector is configured to switch between the first configuration and the second configuration by disconnecting the rear housing from the at least one front housing, then rotating the rear housing 180-degrees about the longitudinal axis to an inverted orientation in relation to the at least one front housing, and then reconnecting the rear housing to the at least one front housing in the inverted orientation.

2. The optical fiber connector of claim 1, wherein the at least one front housing comprises at least two front housings, the at least two front housings having a housing-to-housing spacing and the housing-to-housing spacing differs in the first configuration and the second configuration.

3. The optical fiber connector of claim 2, further comprising a back body assembly comprising a body base and a body lid, wherein the back body assembly is housed within the rear housing.

4. The optical fiber connector of claim 3, wherein each front housing includes an inner connector subassembly comprising:

a holder for holding a respective one or more of the plurality of optical fiber ferrules;

ferrule springs arranged behind the optical fiber ferrules; and a spring push connected to the holder for compressing the ferrule springs forward against the ferrules, wherein the spring push comprises a portion received in the back body assembly.

5. The optical fiber connector of claim 4, further comprising a cable boot connected to the back body assembly.

6. The optical fiber connector of claim 2, wherein in the first configuration, the optical fiber connector can be mated to a first type of receptacle, and in the second configuration, the optical fiber connector can be mated to a second type of receptacle partitioned differently than the first type of receptacle.

7. An optical fiber connector comprising:

a plurality of optical fiber ferrules; and one or more connector housing components configured to hold the plurality of optical fiber ferrules, wherein the optical fiber connector is selectively reconfigurable between a first configuration and a second configuration, wherein in the first configuration, the one or more connector housing components hold the plurality of optical fiber ferrules in a first ferrule arrangement and the optical fiber connector is mateable with a receptacle of a first type such that optical connections can be made to each of the plurality of optical fiber ferrules at the receptacle of the first type and, wherein in the second configuration, the one or more connector housing components hold the plurality of optical fiber ferrules in a second ferrule arrangement and the optical fiber connector is mateable with a receptacle of a second type such that optical connections can be made to each of the plurality of optical fiber ferrules at the receptacle of the second type;

wherein the one or more connector housing components comprise a rear housing and a plurality of front housings extending forward from the rear housing, each front housing receiving at least one of the optical fiber ferrules;

the front housings having a first housing-to-housing spacing in the first configuration and a second housing-to-housing spacing in the second configuration, the second housing-to-housing spacing being greater than the first housing-to-housing spacing;

wherein the optical fiber connector further comprises a back body assembly received in the rear housing, each of the front housings being securable in relation to the back body assembly to extend generally forward from the back body assembly;

wherein the rear housing is configured to receive a multifiber cable and the back body assembly is configured such that a plurality of optical fibers of the multifiber cable are passable through the back body assembly to the plurality of front housings;

wherein the rear housing comprises a first set of attachment points and a second set of attachment points, wherein the rear housing is configured to attach to the plurality of front housings at the first set of attachment points to configure the optical fiber connector in the first configuration and the rear housing is configured to attach to the plurality of front housings at the second set of attachment points to configure the optical fiber connector in the second configuration; and wherein the rear housing comprises a first wall and an opposite second wall, wherein the first set of attachment points are formations on the first wall and the second set of attachment points are formations on the second wall.

8. The optical fiber connector as set forth in claim 7, wherein the optical fiber ferrules have a ferrule spacing that differs in the first ferrule arrangement and the second ferrule arrangement.

9. The optical fiber connector as set forth in claim 7, wherein the receptacle of the first type has a plurality of channels undivided by partition walls and the receptacle of the second type has a plurality of channels divided by partition walls.

10. The optical fiber connector as set forth in claim 7, wherein the receptacle of the first type is shutter-less and the receptacle of the second type has one or more shutters.

11. The optical fiber connector as set forth in claim 7, wherein the one or more connector housing components define a first connector width in the first configuration and a second connector width in the second configuration, the second connector width being wider than the first connector width.

12. The optical fiber connector as set forth in claim 7, wherein each individual formation has generally the same size and shape, wherein the first set of attachment points are spaced apart along a width of the rear housing, the second set of attachment points are also spaced along the width, and the second set of attachment points are more widely spaced than the first set of attachment points.

13. The optical fiber connector as set forth in claim 7, wherein each formation comprises a latch recess, each front housing comprising a latch protrusion configured to latch with one of the latch recesses to attach a respective front housing to the rear housing.

14. The optical fiber connector as set forth in claim 13, wherein each front housing comprises a pullback unlatch actuator configured to be displaced rearward in relation to the respective ferrule(s), and wherein the latch protrusion of each front housing is configured to attach to the rear housing such that the rear housing can be pulled rearward to simultaneously displace the unlatch actuators of each of the plurality of front housings to unlatch the optical fiber connector from a receptacle.

15. The optical fiber connector as set forth in claim 13, wherein the second wall further comprises a first set of alignment recesses and the first wall further comprises a second set of alignment recesses, the first set of alignment recesses being aligned widthwise with the first set of latch recesses and the second set of alignment recesses being aligned widthwise with the second set of latch recesses, each front housing comprising an alignment tab opposite the latch protrusion, each alignment tab configured to be received in an alignment recess when the latch protrusion is received in one of the latch recesses.

16. The optical fiber connector as set forth in claim 7, wherein the optical fiber connector is adjustable from the first configuration to the second configuration by (i) disconnecting the rear housing from the plurality of front housings at the first set of attachment points, (ii) rotating the rear housing 180 degrees in relation to the front housings, and (iii) attaching the rear housing to the front housings at the second set of attachment points.

17. The optical fiber connector as set forth in claim 7, wherein the back body assembly comprises a plurality of spaced apart adjustment openings.

18. The optical fiber connector as set forth in claim 7, further comprising a respective inner connector subassembly in each front housing.

19. An optical fiber connector comprising:

a plurality of optical fiber ferrules; and one or more connector housing components configured to hold the plurality of optical fiber ferrules, wherein the optical fiber connector is selectively reconfigurable between a first configuration and a second configuration, wherein in the first configuration, the one or more connector housing components hold the plurality of optical fiber ferrules in a first ferrule arrangement and the optical fiber connector is mateable with a receptacle of a first type such that optical connections can be made to each of the plurality of optical fiber ferrules at the receptacle of the first type and, wherein in the second configuration, the one or more connector housing components hold the plurality of optical fiber ferrules in a second ferrule arrangement and the optical fiber connector is mateable with a receptacle of a second type such that optical connections can be made to each of the plurality of optical fiber ferrules at the receptacle of the second type;

wherein the one or more connector housing components comprise a rear housing and a plurality of front housings extending forward from the rear housing, each front housing receiving at least one of the optical fiber ferrules;

the front housings having a first housing-to-housing spacing in the first configuration and a second housing-to-housing spacing in the second configuration, the second housing-to-housing spacing being greater than the first housing-to-housing spacing;

wherein the optical fiber connector further comprises a back body assembly received in the rear housing, each of the front housings being securable in relation to the back body assembly to extend generally forward from the back body assembly;

wherein the back body assembly comprises a plurality of spaced apart adjustment openings;

the optical fiber connector further comprising a spring push for each front housing, each spring push coupled to the respective front housing for movement with the front housing and configured to be movably received in a respective one of the adjustment openings such that the front housing is adjustable in relation to the back body assembly.

20. The optical fiber connector as set forth in claim 19, wherein each spring push is movable in the respective adjustment opening between a first configuration position and a second configuration position.

21. The optical fiber connector as set forth in claim 20, wherein the back body assembly comprises a slide groove at each of the adjustment openings, each spring push comprising a flange having opposite edge margins slidably received in the respective slide groove such that the spring push is constrained in relation to the back body assembly to move by sliding of the flange along the slide groove.

22. The optical fiber connector as set forth in claim 19, wherein the optical fiber connector is configured to terminate a multifiber cable, the rear end portion of the back body assembly defining a cable opening through which a plurality of optical fibers of the multifiber cable are passable to the adjustment openings, each of the adjustment openings being configured so that a subset of the plurality of optical fibers are passable through the adjustment opening to the respective front housing.

* * * * *